(12) United States Patent
Koumo et al.

(10) Patent No.: US 6,493,900 B1
(45) Date of Patent: Dec. 17, 2002

(54) VEHICLE WIPER DEVICE

(75) Inventors: Yoshiyuki Koumo, Toyohashi (JP); Yoshimasa Sato, Shizuoka-ken (JP); Tetsuya Nakatsukasa, Okazaki (JP)

(73) Assignee: Asmo Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/503,785

(22) Filed: Feb. 14, 2000

(30) Foreign Application Priority Data

| Feb. 15, 1999 | (JP) | ............................................. 11-035469 |
| Feb. 17, 1999 | (JP) | ............................................. 11-038510 |
| Mar. 3, 1999 | (JP) | ............................................. 11-055110 |
| Jun. 18, 1999 | (JP) | ............................................. 11-172966 |

(51) Int. Cl.$^7$ ................................ B60S 1/58; B60S 1/16
(52) U.S. Cl. ................ 15/250.3; 15/250.31; 296/96.17; 296/96.21
(58) Field of Search ................ 15/250.3, 250.31, 15/250.16, 250.17, 250.34; 296/96.2, 96.17, 96.13, 96.21

(56) References Cited

U.S. PATENT DOCUMENTS 2,046,108 A * 6/1936 Drew ....................... 15/250.3

FOREIGN PATENT DOCUMENTS

| DE | 2728088 | * | 1/1978 | ................ 15/250.3 |
| DE | 3313057 | * | 10/1984 | ................ 15/250.3 |
| FR | 2724616 | * | 3/1996 | ................ 15/250.3 |
| GB | 353336 | * | 7/1931 | ................ 15/250.3 |
| GB | 365603 | * | 1/1932 | ................ 15/250.3 |
| GB | 1448892 | | 4/1974 | |
| JP | 2-18761 | | 2/1990 | |
| JP | 103318 | | 4/2000 | |

* cited by examiner

*Primary Examiner*—Gary K. Graham
(74) *Attorney, Agent, or Firm*—Lumen Intellectual Property Services, Inc.

(57) ABSTRACT

A wiper device is located between a vehicle rear door and a rear window, which is opened independently from the door. An actuator having an output shaft is fixed to the rear door. A pivot disk is fixed to the output shaft. The pivot disk has a coupler hole. The actuator pivots the coupler hole in a predetermined angle range. A pivot shaft having a wiper arm is supported by the rear window glass. A crank lever having a coupler pin is fixed to the pivot shaft. When the rear window glass is closed with the coupler pin outside of the movement range of the coupler hole, engagement between the coupler pin and the coupler hole moves the coupler pin to the angle range of the coupler hole. Accordingly, the crank lever is positively coupled to the pivot disk by a simple structure.

38 Claims, 20 Drawing Sheets

Close ←——→ Open

Close ⟷ Open

Close ⟵⟶ Open

Close ←→ Open

– 1 –
VEHICLE WIPER DEVICE

BACKGROUND OF THE INVENTION

The present invention relates to a vehicle wiper device, and more particularly to a wiper device for wiping an openable rear window.

A typical station wagon or a hatchback has a rear door for opening a trunk. There are openable glass type rear doors. The glass of an openable glass type rear door can be opened independently from the rear door. A typical wiper device for wiping the window glass of an openable glass type rear door is directly attached to the window glass.

The wiper device has a relatively heavy actuator. When the window is shut, the glass may collide with the rear door. The collision applies a relatively great force to the glass where the actuator is fixed. This can damage the glass. Manually opening and closing the window requires relatively great physical force. Also, if the actuator is attached to the glass, wiring for supplying electricity to the motor in the actuator becomes complicated.

To solve the above drawbacks, a wiper device having an actuator attached to the rear door has been proposed. In this device, a wiper arm is pivotally supported by the rear window. When the rear window is closed, the wiper arm is coupled to the actuator.

FIGS. 25 and 26 illustrate such a wiper device. The device includes an actuator 101, a transmission unit 102 and a wiper arm 103.

The actuator 101 is fixed to a rear door 104. A pivot disk 106 is fixed to an output shaft 105 of the actuator 101. The pivot disk 106 is rotated within a predetermined angle range, and the direction of rotation alternates. The disk 106 has a coupler hole 106a, which is radially spaced from the axis of the output shaft 105.

The transmission unit 102 includes a shaft holder 107, which is fixed to a rear window 108, which is glass. A pivot shaft 109 is rotatably supported by the shaft holder 107. When the rear window 108 is closed as illustrated in FIG. 25, the axis of the pivot shaft 109 is aligned with the axis of the output shaft 105. The distal end of the pivot shaft 109 extends to the exterior of the rear window 108. The wiper arm 103 is fixed to the distal end of the pivot shaft 109. The distal end of the wiper arm 103 is coupled to a wiper blade (not shown). The wiper blade wipes the surface of the rear window 108.

The distal end of the pivot shaft 109 (the end extending to the actuator 101) is coupled to the crank lever 110. As shown in FIGS. 25 to 28, the distal end of the crank lever 110 is coupled to a cylindrical pin holder 112. A substantially cylindrical coupler pin 111 is supported by the pin holder 112. The coupler pin 111 is axially movable in a direction parallel to the axis of the pivot shaft 109. The pin 111 is urged toward the disk 106 by a spring 115 accommodated in the pin holder 112. One end of the pin 111 is coupled to a limit ring 116.

When the rear window 108 is closed as shown in FIG. 25, the coupler pin 111 enters the coupler hole 106a in the disk 106, which operably couples the crank lever 110 to the disk 106. When the actuator 101 pivots the disk 106, the crank lever 110 pivots integrally with the disk 106. The alternating rotation of the crank level 110 is transmitted to the wiper arm 103 by the pivot shaft 109. Accordingly, the wiper arm 103 pivots in an angle range that corresponds to the angle range of the disk 106, which causes the wiper blade to wipe the surface of the rear window 108.

When the rear window 108 is opened, the coupler pin 111 is separated from the coupler hole 106a, which disengages the crank lever 110 from the pivot disk 106.

When the rear window 108 is opened, the wiper arm 103, the pivot shaft 109 and the crank lever 110 are free to pivot. Thus, if the rear window 108 is closed, the coupler pin 111 on the crank lever 110 may be misaligned with the coupler hole 106a. In this case, the coupler pin 111 contacts the surface of the pivot disk 106 and retracts against the force of the spring 115. However, the pin 111 is located in the path of the hole 106a, and the hole 106a eventually becomes aligned with the pin 111 when the pivot disk 106 is pivoted by the actuator 101. When aligned with the hole 106a, the pin 111 enters the hole 106a.

To cause the pin 111 to positively enter the hole 106a, the wiper device of FIGS. 25 to 28 has pair of limit plates 113. The limit plates 113 are fixed to the holder 107 and are spaced apart by a predetermined angular interval to limit the pivot angle range of the crank lever 110 or the range of the pin 111. As shown in FIG. 27, a rubber cushion 114 is fitted about the pin holder 112 to reduce noise that is produced when the pin 111 hits the limit plates 113. The rubber cushion 114 contacts the limit plates 113, which limits the pivot angle range of the crank lever 110 within the pivot angle range X of the hole 106a. Therefore, when the rear window 108 is closed, the pin 111 is always located within the angle range X, or the path, of the hole 106a.

When the rubber cushion 114 contacts one of the limit plates 113 as shown in FIG. 27, the pin 111 is located within the range X of the hole 106a by a distance B. This is done to prevent the pin 111 from moving outside the range X of the hole 106a. However, the range X of the hole 106a is needed to permit the wiper blade to wipe a sufficient area on the window 108. Therefore, the wiper arm 103 must pivot in the range X of the hole 106a.

In FIG. 28, the pin 111 is engaged with the hole 106a. The rubber cushion 114 contacts one of the plates 113 and is deformed to permit the hole 106a to move to the end of the range X. Therefore, when the rear window 108 is closed, the crank lever 110 and the wiper arm 103 can be pivoted in a range that corresponds to the range X of the hole 106a.

However, in the wiper device of FIGS. 25 to 27, the rubber cushion 114 collides with one of the limit plate 113 every time the hole 106a is moved to one of the ends of the range X. This generates noise and can damage the rubber cushion 114 or the limit plates 113.

SUMMARY OF THE INVENTION

Accordingly, it is an objective of the present invention to provide a simple and durable vehicle wiper device that securely engages a pivot shaft of a wiper arm with an actuator.

To achieve the foregoing and other objectives and in accordance with the purpose of the present invention, a wiper device for wiping a window supported by a support is provided. The wiper device is located between the window and the support. The window opens and closes an opening in the support. The device includes an actuator, a first coupler, a pivot shaft, a second coupler, a wiper arm and a guidance structure. The actuator is supported by the support and has an output shaft. The first coupler is attached to the output shaft. The actuator pivots the first coupler in a first angle range. The pivot shaft is rotatably supported by the window. When the window is closed, the axis of the pivot shaft is aligned with the axis of the output shaft. The second coupler is attached to the pivot shaft. When the window is closed and the second coupler is at a predetermined rotational phase relative to the first coupler, the second coupler is coupled to the first coupler to transmit rotation of the output shaft to the pivot shaft. The wiper arm is attached to the pivot shaft. When the actuator is activated with the second coupler coupled to the first coupler, the wiper arm pivots in an angle range corresponding to the first angle range. When the second coupler is outside the first angle range, the guidance structure guides the second coupler to the first angle range by mechanical engagement.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
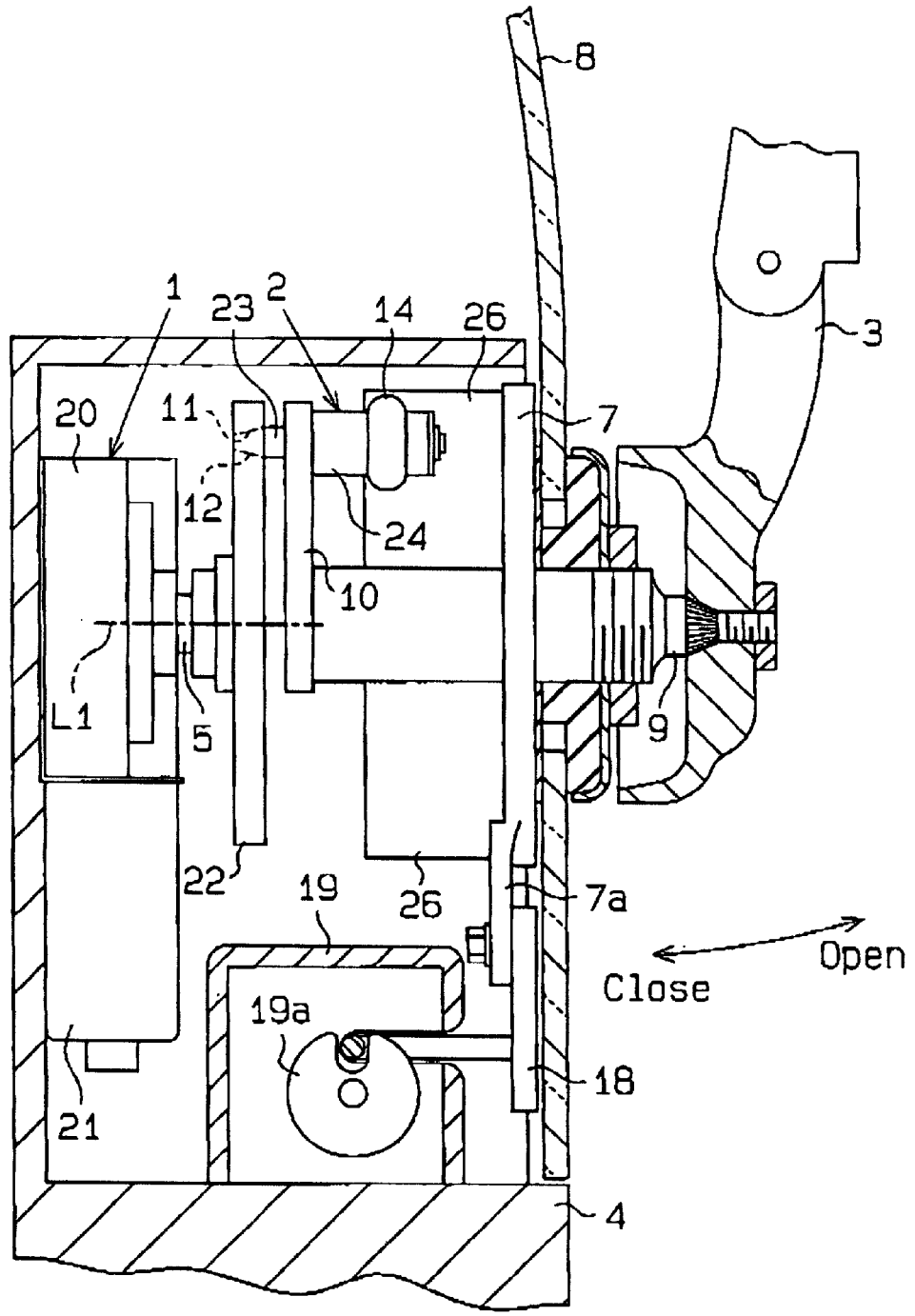
FIG. 1 is a cross-sectional view illustrating a wiper device according to a first embodiment of the present invention.

A first embodiment of the present invention will now be described with reference to FIGS. 1 to 7. A wiper device shown in FIGS. 1 and 2 wipes a rear window 8 in this embodiment. The rear window 8 is supported by a support, which is a rear door 4 in this embodiment. The rear window 8 pivots relative to the rear door 4 to open a window opening formed in the door 4. The wiper device includes an actuator 1 located on the rear door 4, a transmission unit 2 attached to the rear window 8, and a wiper arm 3. The wiper arm 3 is attached to the power transmission unit 2.

Figure 2:
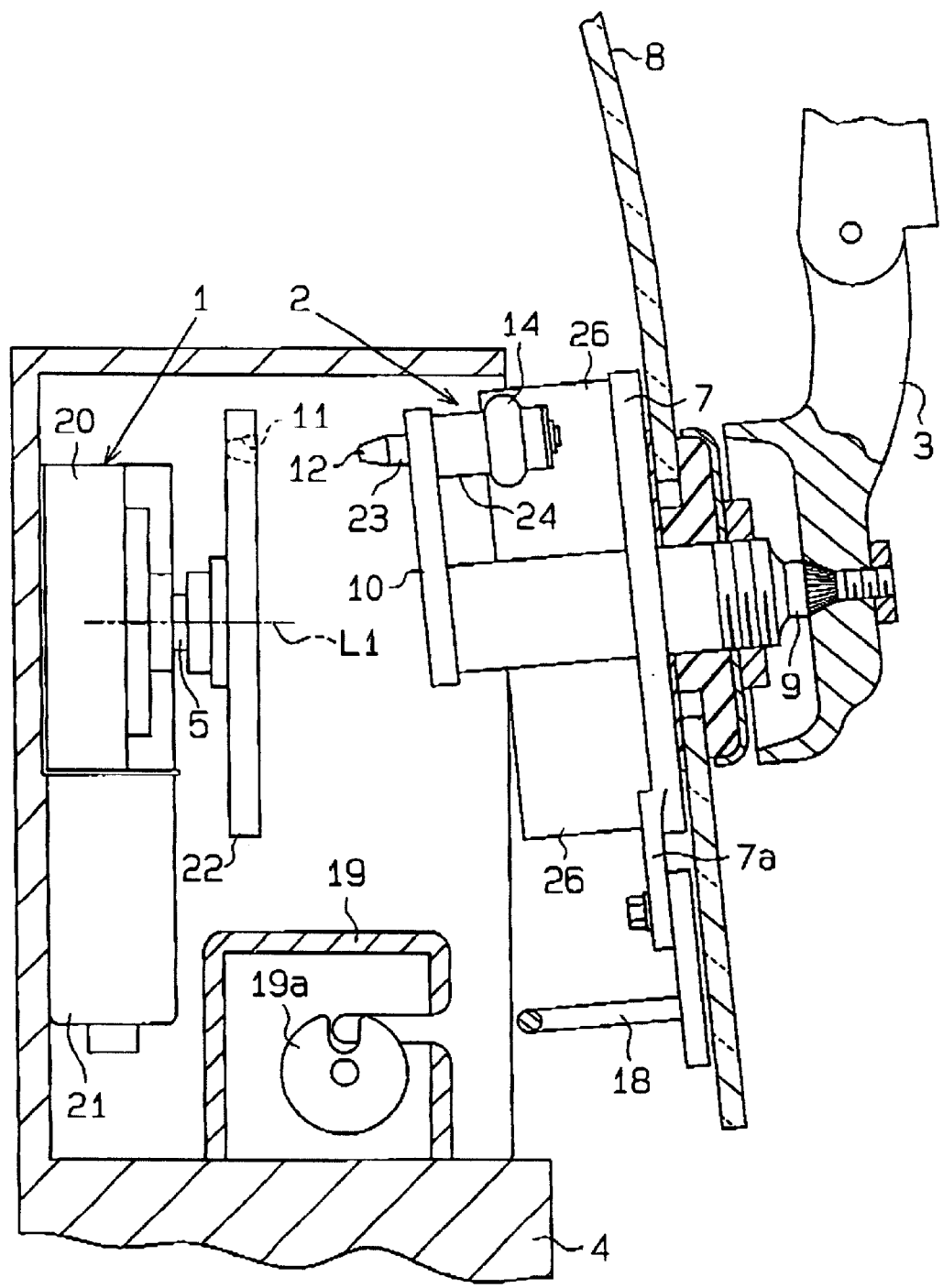
FIG. 2 is a cross-sectional view of the wiper of FIG. 1 when the rear window is opened.
Figure 3:
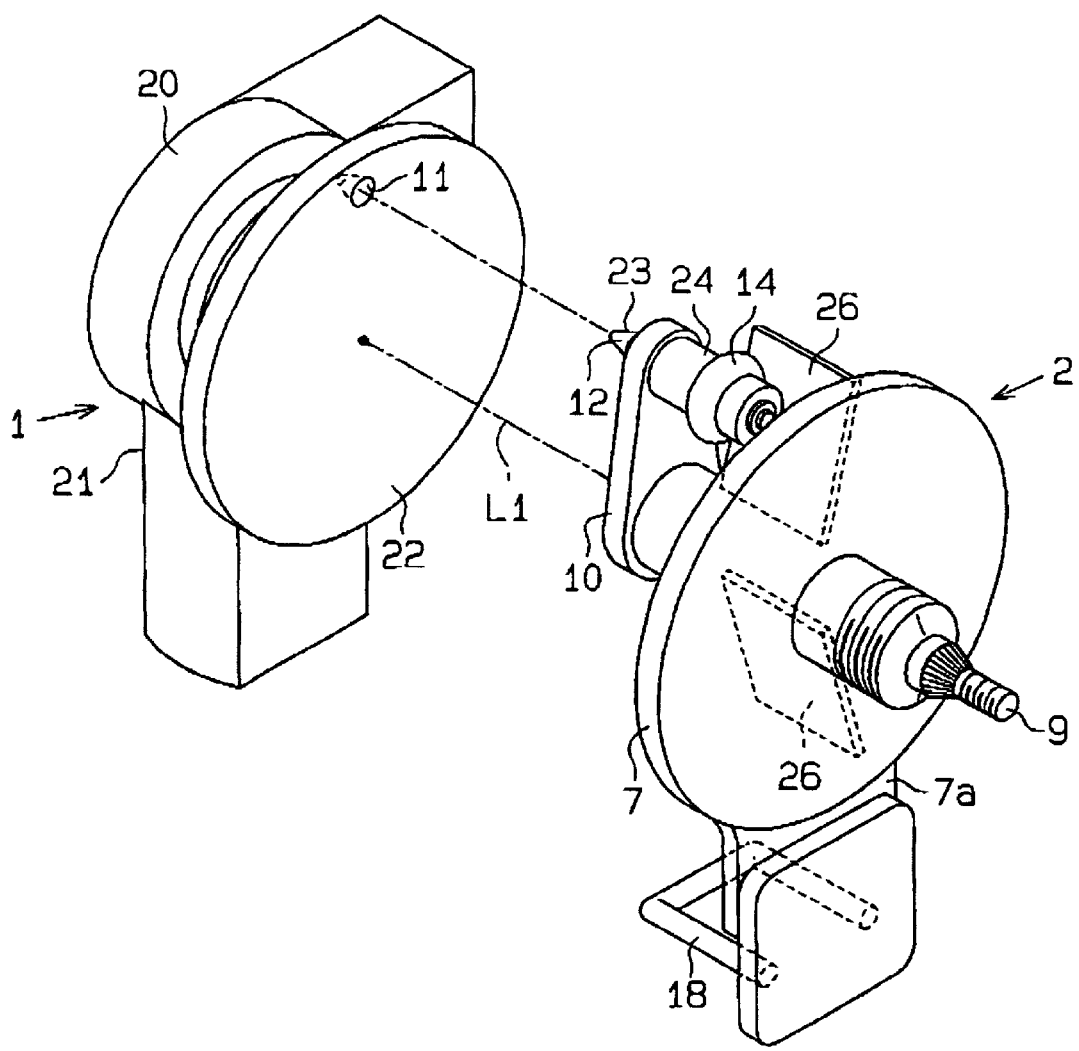
FIG. 3 is a perspective view showing the wiper device of FIG. 1.

As shown in FIGS. 1 to 3, the actuator 1 includes a motor 21 and a speed reducer 20. An output shaft 5 extends from the speed reducer 20. A first coupler, which is a pivot disk 22, is fixed to the output shaft 5. The motor 21 pivots the pivot disk 22 through the speed reducer 20 and the output shaft 5. Accordingly, the pivot disk 22 pivots in a predetermined angular range.

The pivot disk 22 has an engagement opening, which is a coupler hole 11 in this embodiment. The coupler hole 11 is spaced apart from the axis L1 of the output shaft 5, or from the axis of the pivot disk 22. The coupler hole 11 is a tapered hole extending through the pivot disk 22. The diameter of the coupler hole 11 increases toward the transmission unit 2.

The transmission unit 2 includes a shaft holder 7, which is fixed to the rear window 8. A pivot shaft 9 is rotatably supported by the shaft holder 7. When the rear window 8 is closed as shown in FIG. 1, the axis of the pivot shaft 9 is aligned with the axis of the output shaft 5.

A stay 7a extends downward from the shaft holder 7. A striker 18 is fixed to the stay 7a, for example, by a bolt. A latch device 19 is fixed to the rear door 4 to face the striker 18. The latch device 19 includes a latch wheel 19a. When the rear window 8 is closed as shown in FIG. 1, the stricker 18 engages the latch wheel 19a, which holds the rear window 8 at the closed position.

The distal end of the pivot shaft 9 protrudes from the rear window 8. The wiper arm 3 is secured to the distal end of the pivot shaft 9. A wiper blade (not shown) is coupled to the distal end of the wiper arm 3 to wipe the rear window 8.

The proximal end of the pivot shaft 9 extends toward the actuator 1 and is fixed to a second coupler, which is a crank lever 10 in this embodiment. As shown in FIGS. 1 to 5, the distal end of the crank lever 10 is fixed to a cylindrical pin holder 24. The pin holder 24 extends from the crank lever 10 toward the shaft holder 7. An elastic body, which is a rubber cushion 14 in this embodiment, is fitted about the pin holder 24.

Figure 4:
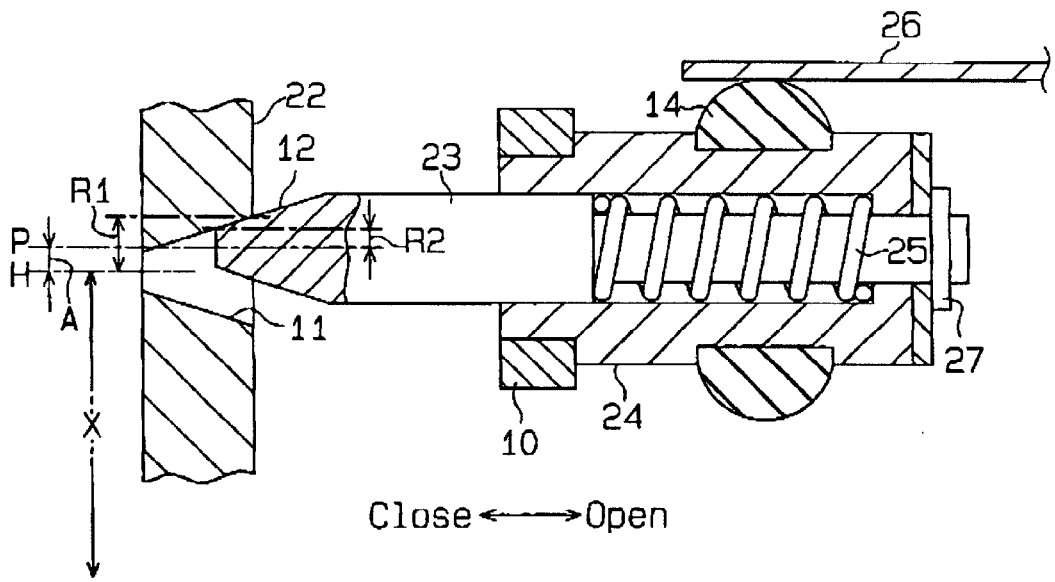
FIG. 4 is an enlarged partial cross-sectional view showing the coupler pin and the coupler hole of the wiper device shown in FIG. 1.
Figure 5:
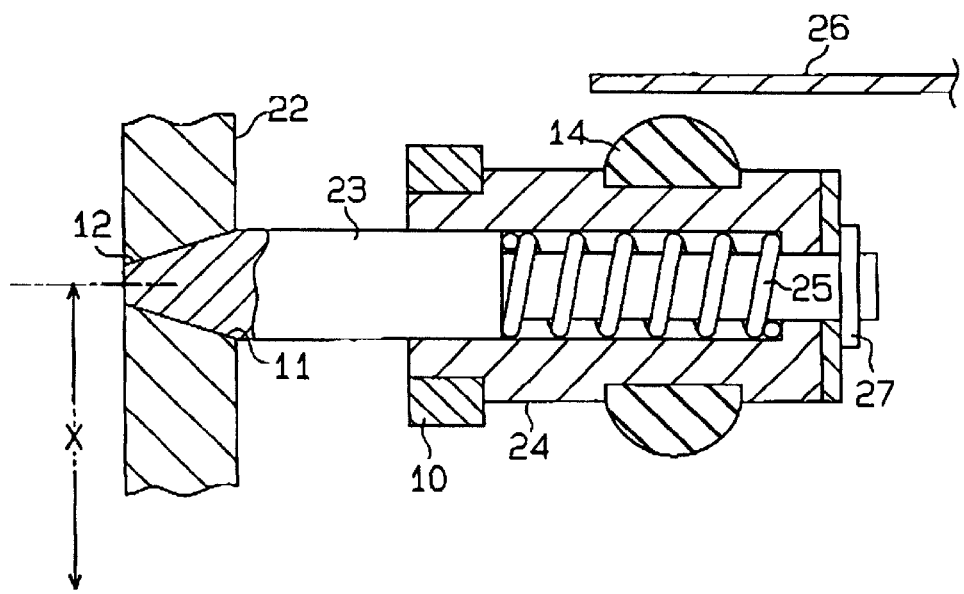
FIG. 5 is an enlarged partial cross-sectional view when the coupler pin of FIG. 4 is fully inserted in the coupler hole.

As shown in FIGS. 4 and 5, a substantially cylindrical coupler pin 23 is supported by the pin holder 24 to be axially movable. That is, the coupler pin 23 can move in a direction parallel to the axis of the pivot shaft 9. The coupler pin 23, which functions as an engagement protection, is urged toward the pivot disk 22 by a spring 25 located in the pin holder 24. A limit ring 27 is fixed to the proximal end of the coupler pin 23. The limit ring 27 prevents the coupler pin 23 from disengaging from the pin holder 24. The distal end of the coupler pin 23 is tapered to form an engagement portion, which is a tip 12 in this embodiment. The shape of the tip 12 corresponds to the shape of the coupler hole 11 of the pivot disk 22. As shown in FIG. 5, when the tip 12 is fully fitted in the coupler hole 11, there is no space, or slack, between the tip 12 and the coupler hole 11.

As shown in FIGS. 1 to 3, a pair of limit plates 26 are fixed to the shaft holder 7. The limit plates 26 are spaced apart by a predetermined angle. As shown in FIG. 4, contact between the rubber cushion 14 and the limit plates 26 defines the angular movement range of the crank lever 10, or the angular range of the coupler pin 23.

Figure 6:
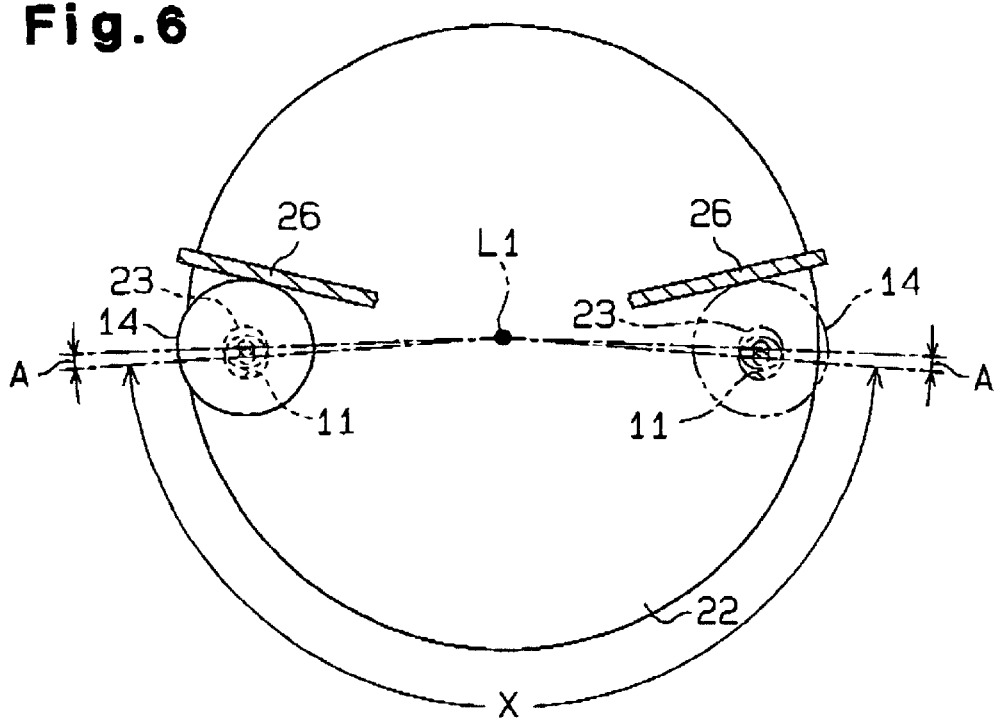
FIG. 6 is diagrammatic view corresponding to FIG. 4, showing the operation of the wiper device.
Figure 7:
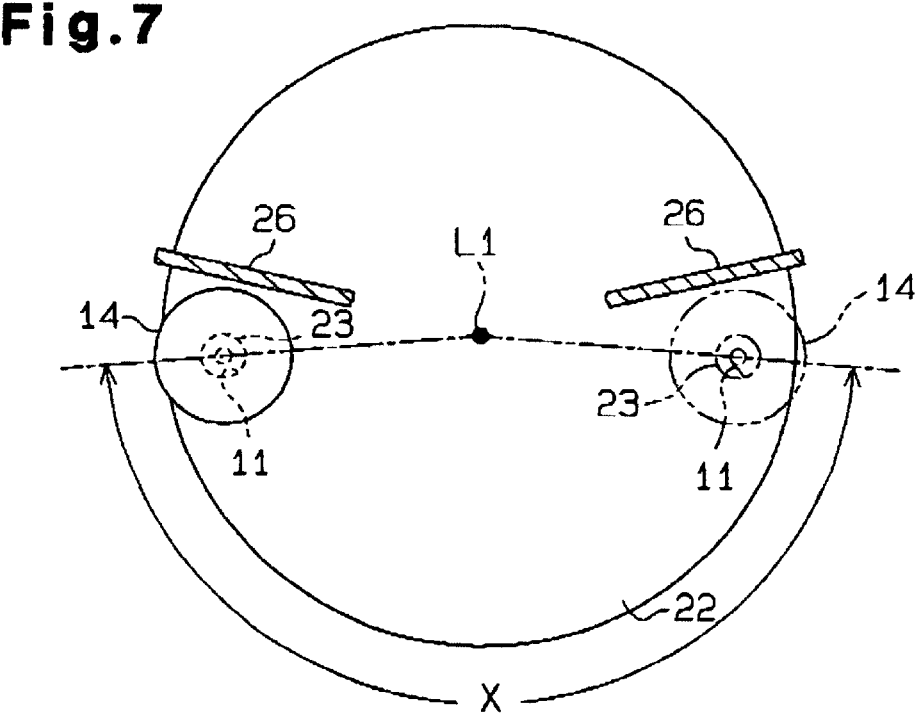
FIG. 7 is diagrammatic view corresponding to FIG. 5, showing the operation of the wiper device.

A range X shown in FIGS. 6 and 7 is the movement range of the coupler hole 11. The coupler hole is moved in the range X by the actuator 1. The range X is determined such that the wiper blade of the wiper arm 3 wipes a sufficient area of the rear window 8. When the wiper device is stopped, the coupler hole 11 is located at one end (initial position) of the range X.

When the rubber cushion 14 contacts one of the limit plate 26 as illustrated in FIGS. 4 and 6, the coupler pin 23 is out of the range X. Specifically, the axis of the coupler pin 23 is spaced apart from the end of the range X by a distance A. Therefore, the movement range of the coupler pin 23 is greater than the pivot range X of the coupler hole 11 by a distance approximately equal to twice the distance A. The distance A is less than the distance calculated by subtracting the radium R2 of the end face of the coupler pin 23 from the radius R1 of the large diameter opening of the coupler hole 11. Although FIG. 6 shows the distance A measured at a location radially outward of the pin 23, distance A is actually measured at the radial location of the axis of the pin 23. If the displacement between the coupler pin 23 and the coupler hole 11 is within the distance A, the coupler pin 23 will be guided to fully enter the coupler hole 11.

In FIG. 4, the axis P of the coupler pin 23 is spaced apart from the axis H of the coupler hole 11 by the distance A. If the pin holder 24 is moved toward the pivot disk 22, the coupler pin 23 is guided by the wall of the coupler hole 11 to be fully fitted to the coupler hole 11 (see FIG. 5). The spring constant of the spring 25 is determined such that the spring 25 is not contracted by the engagement between the coupler pin 23 and the coupler hole 11.

As the coupler pin 23 is moved from the position of FIG. 4 to the position of FIG. 5 along the wall of the coupler hole 11, the axis of the coupler pin 23 moves about the axis L1 of the pivot disk 22 by the distance A. At this time, the crank lever 10, the pivot shaft 9 and the wiper arm 3 are integrally rotated with the coupler pin 23. When the coupler pin 23 is moved along the wall of the coupler hole 11, there is resistance to rotation of these parts due to friction and inertia. The spring 25 urges the coupler pin 23 such that the coupler pin 23 is not moved axially relative to the pin holder 24 at a result of this resistance.

When the rear window 8 is closed and the coupler pin 23 is fitted in the coupler hole 11 of the pivot disk 22 as shown in FIGS. 1 and 5, the crank lever 10 is coupled to the pivot disk 22. When the actuator 1 pivots the coupler hole 11 in the pivot range X as shown in FIG. 7, the crank lever 10 is pivoted integrally with the pivot disk 22. The pivoting of the crank lever 10 is transmitted to the wiper arm 3 through the pivot shaft 9. Accordingly, the wiper arm 3 is pivoted in the pivot range of the pivot disk 22, or the pivot range X of the coupler hole 11, which causes the wiper blade of the wiper arm 3 to wipe the rear window 8.

As described above, the movement range of the coupler pin 23 is greater than the pivot range X of the coupler hole 11 by approximately twice the distance A. Therefore, if the coupler hole 11 is moved to one of the end of the range X as illustrated in FIGS. 5 and 7, the rubber cushion 14 does not collide with the limit plate 26. Accordingly, noise is reduced and the rubber cushion 14 and the limit plates 26 are not damaged.

When the rear window 8 is opened, the coupler pin 23 is disengaged from the coupler hole 11 as illustrated in FIG. 2, which disengages the crank lever 10 from the pivot disk 22.

When the rear window 8 is opened, the wiper arm 3, the pivot shaft 9 and the crank lever 10 are free to rotate. Thus, when the rear window 8 is closed, the coupler pin 23 on the crank lever 10 may not be aligned with the coupler hole 11.

If the coupler pin 23 is misaligned with the coupler hole 11 and within the pivot range X, the coupler pin 23 contacts the pivot disk 22 as the window 8 is closed, which retracts the pin 23 against the force of the spring 25. If the wiper device is activated in this state, the coupler hole 11 aligns with the coupler pin 23 before the actuator 1 completes a full cycle of movement. When the coupler hole 11 comes into alignment with the coupler pin 23, the pin 23 is fitted in the coupler hole 11 by the force of the spring 25. Accordingly, the crank lever 10 is coupled to the pivot disk 22.

On the other hand, if the coupler pin 23 is at a position outside of the range X and the rubber cushion 14 contacts one of the limit plate 26 as shown in FIGS. 4 and 6, the wiper device operates as follows. When the rear window 8 is closed, the coupler pin 23 is guided by the wall of the coupler hole 11 and is consequently fully fitted in the coupler hole 11 as shown in FIGS. 5 and 7, which couples the crank lever 10 with the pivot disk 22. At this time, the spring 25 is not contracted. The coupler pin 23 is thus not moved in the axial direction of the pin holder 24.

When the wiper device is deactivated, the coupler hole 11 is normally located at one of the ends of the range X, or at the initial position. In some cases, however, the coupler hole 11 is not at one of the ends of the range X. If the rear window 8 is shut with the rubber cushion 14 contacting one of the limit plates 26, the coupler pin 23 contacts the pivot disk 22 and retracts against the force of the spring 25. When the wiper device is activated and the coupler hole 11 moves to the initial position, the coupler pin 23 is guided by the wall of the coupler hole 11 and is fully fitted in the coupler hole 11.

As described above, when the window 8 is closed with the coupler pin 23 being outside the initial position of the coupler hole 11, the coupler pin 23 engages the coupler hole 11. This rotates the coupler pin 23 to the initial position. In other words, the coupler pin 23, which is located outside the range X, is guided to a position within the range X by mechanical engagement between the coupler pin 23 and the coupler hole 11.

As a result, the device of FIGS. 1 to 7 permits the coupler pin 23 to fully engage the coupler hole 11 and prevents the rubber cushion 14 from colliding with the limit plates 26.

The described advantages are achieved by the tapered tip 12 of the coupler pin 23 and the tapered coupler hole 11. The device therefore has a simple structure and is easy to manufacture. The tapered pin 23 and the tapered hole 11 effectively guide the pin 23 into the hole 11 and permit the pin 23 and the hole 11 to be firmly engaged.

The coupler pin 23 may be radially displaced from the coupler hole 11 due to errors produced when machining and assembling the parts. However, when the rear window 8 is closed, the tapered coupled pin 23 is smoothly and firmly fitted in the tapered coupler hole 11. In other words, the tapered coupler pin 23 and the tapered coupler hole 11 do not require high machining and assembling accuracy, which facilitates the manufacture and the installation of the wiper device.

The actuator 1 and the pivot disk 22 are relatively large and heavy among the parts forming the wiper device. In the embodiment of FIGS. 1 to 7, the actuator 1 and the pivot 22 are supported by the rear door 4, which reduced load on the rear window 8. The rear window 8 thus can be opened and closed by a relatively weak force. Also, the rear window 8 receives relatively small load when being closed.

Figure 8:
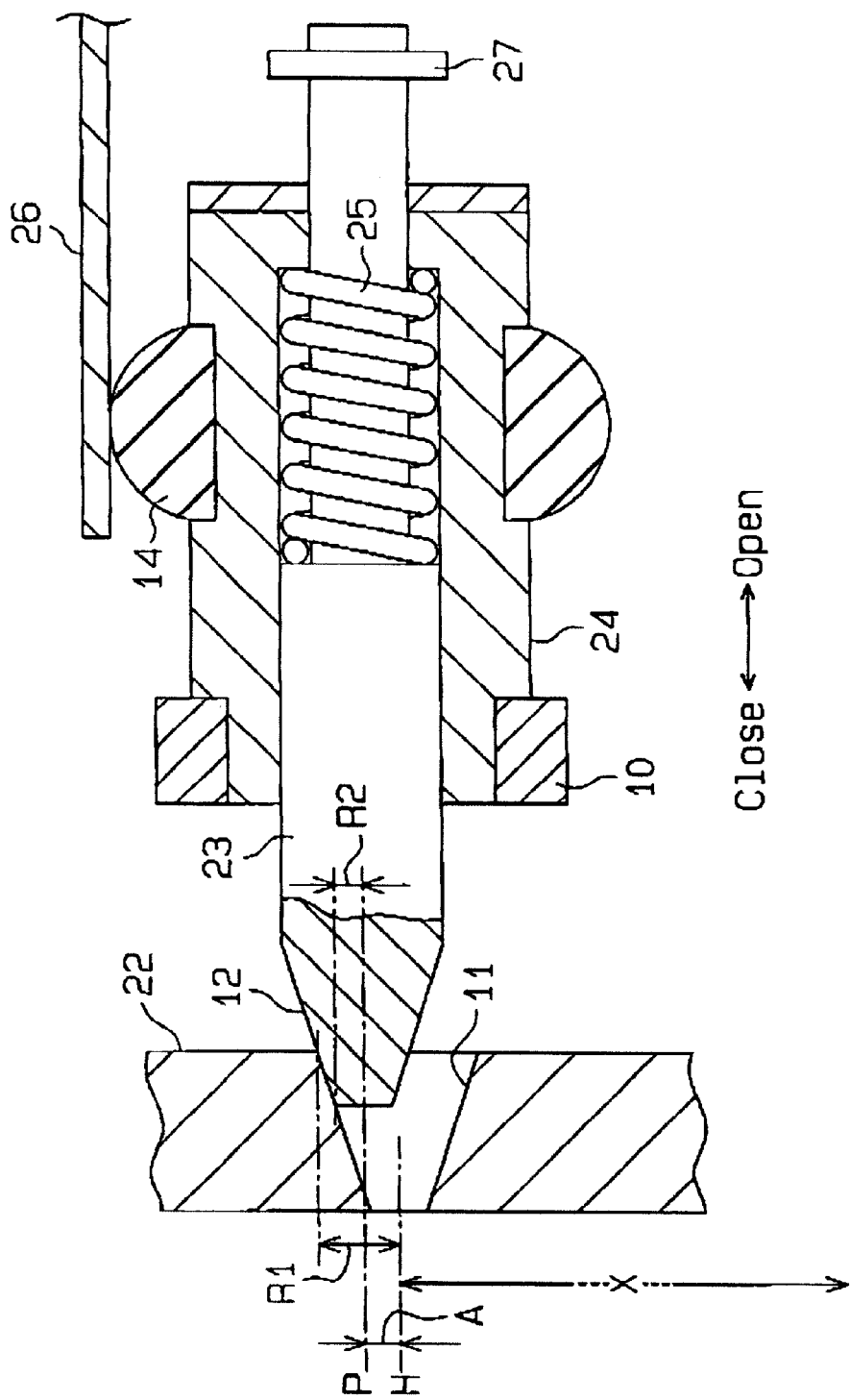
FIG. 8 is an enlarged partial cross-sectional view showing the operation of a wiper device according to a second embodiment of the present invention.

FIG. 8 illustrates a second embodiment of the present invention. The appearance of the wiper device shown in FIG. 8 is the same as the device shown in FIGS. 1 to 7. The spring constant of the spring 25 shown in FIG. 8 is smaller than that of the spring 25 shown in FIGS. 4 and 5.

In the embodiment of FIG. 8, when the rear window 8 is shut with the rubber cushion 14 contacting one of the limit plates 26, the distal end of the tip 12 of the coupler pin 23 contacts the inner wall of the coupler hole 11 as in the case of FIG. 4. However, if the rear window 8 is moved further in the closing direction, the spring 25 is contracted as shown in FIG. 8, which maintains the angular position of the coupler pin 23. The coupler pin 23 is moved axially relative to the pin holder 24 while being fitted in the hole 11. That is, unlike the device of FIGS. 1 to 7, the spring 25 does not have a relatively large spring constant that would cause the coupler pin 23 to move along the inner wall of the hole 11 against the friction between the pin 23 and the hole 11.

If the wiper device starts operating in the state of FIG. 8, the pivot disk 22 is rotated in one direction (downward as viewed in FIG. 8) by the actuator 1. At this time, the coupler pin 23 continues engaging the coupler hole 11, that is, provisionally engaged, and is moved integrally with the pivot disk 22. However, when the rotation direction of the pivot disk 22 is changed, the coupler pin 23 is fully fitted in the coupler hole 11 by the force of the spring 25 (see FIG. 5). Thus, the crank lever 10 is firmly coupled to the pivot disk 22.

The operation of the device shown in FIG. 8 is achieved by changing the spring constant of the spring 25. However, the same operation may be achieved by changing the taper angle of the tip 12 and the coupler hole 11 or by changing the friction coefficient of the tip 12 or of the inner wall of the coupler hole 11.

Figure 9:
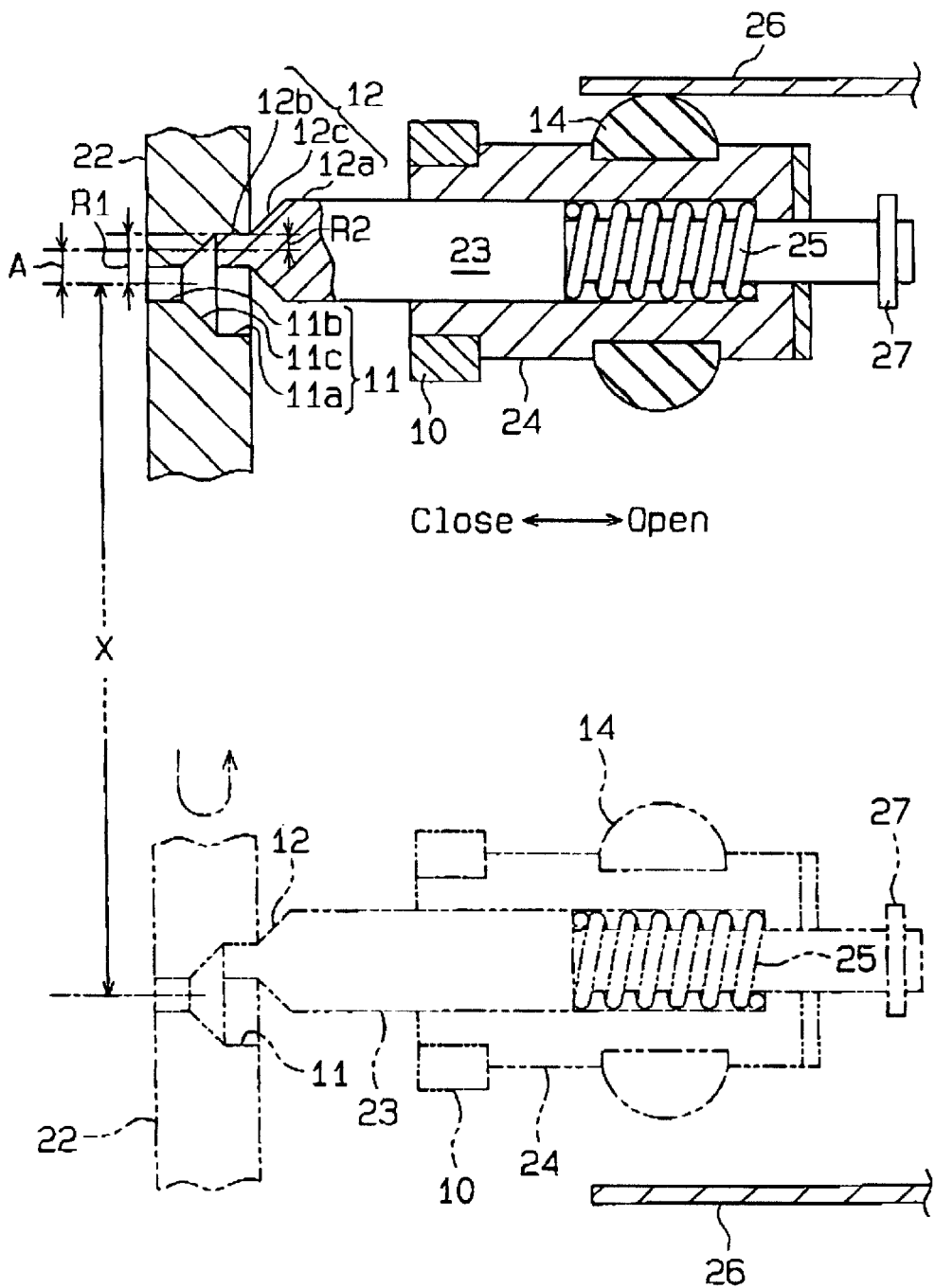
FIG. 9 is an enlarged partial cross-sectional view illustrating a coupler pin and a coupler hole of a wiper device according to a third embodiment of the present invention.

FIG. 9 illustrates a wiper device according to a third embodiment. The device of FIG. 9 is different from the device of FIG. 8 in the shape of the tip 12 of the coupler pin 23 and the shape of the coupler hole 11. As shown in FIG. 9, the tip 12 includes a large diameter portion 12a, a small diameter portion 12b and a tapered portion 12c. The tapered portion 12c is located between the large diameter portion 12a and the small diameter portion 12b. The diameter of the large diameter portion 12a is equal to the diameter of the coupler pin 23. The shape of the coupler hole 11 corresponds to that of the tip 12. That is, the coupler hole 11 includes a large diameter portion 11a, a small diameter portion 11b and a tapered portion 11c. The tapered portion 11c is located between the large diameter portion 11a and the small diameter portion 11b.

In the embodiment of FIG. 9, the distance A is smaller than the distance calculated by subtracting the radius of the small diameter portion 12b of the tip 12 from the radius of the large diameter portion 11a of the coupler hole 11. In other words, like the device of FIGS. 1 to 7 and the device of FIG. 8, the distance A is less than the distance calculated by subtracting the radius R2 of the end face of the coupler pin 23 from the radius R1 of the large diameter portion of the coupler hole 11. If the displacement between the coupler pin 23 and the coupler hole 11 is within the distance A, the coupler pin 23 will be guided to fully enter the coupler hole 11.

The device of FIG. 9 operates substantially in the same manner as the device of FIG. 8. That is, when the rear window 8 is closed with the rubber cushion 14 contacting one of the limit plates 26, the small diameter portion 12b of the tip 12 enters the large diameter portion 11a of the coupler hole 11 thereby engaging the inner wall of the coupler hole 11. In this state, if the rear window 8 is further moved in the closing direction, the spring 25 is contracted to maintain the axial position of the coupler pin 23 relative to the pivot disk 22. The coupler pin 23 moves in the axial direction relative to the pin holder 24 while being fitted in the coupler hole 11.

If the wiper device is activated in the provisionally engaged state as shown in FIG. 9, the pivot disk 22 is rotated in one direction (downward as viewed in FIG. 9) by the actuator 1. At this time, the coupler pin 23 continues engaging the inner wall of the coupler hole 11, that is, provisionally engaged, and is moved with the pivot disk 22. However, as shown in two-dot chain line in FIG. 9, when the rotational direction of the pivot disk 22 is reversed, the coupler hole 11 is moved relative to the coupler pin 23 such that the axis of the coupler hole 11 approaches the axis of the coupler pin 23. As a result, the coupler pin 23 is fully fitted in the coupler hole 11 by the force of the spring 25.

The spring constant of the spring 25, the angle of the tapered portions 11c, 12c and the friction coefficient of the tip 12t and the coupler hole 11 may be changed such that the device of FIG. 9 operates in the same manner as the device of FIGS. 1 to 7. That is, the device of FIG. 9 may be modified such that there is no provisional engagement. In this case, if the rear window 8 is closed with the rubber cushion 14 contacting one of the limit plates 26, the spring 25 is not contracted and the tip 12 is guided along the inner wall of the coupler hole 11 to be fully fitted in the coupler hole 11.

In the embodiments of FIGS. 1 to 9, one of the tip 12 or the coupler hole 11 may be cylindrical. In this case, the device functions in the same manner as the illustrated embodiments. Alternatively, the tapered portion of the tip 12 or the tapered surface of the coupler hole 11 may be curved in the axial direction. Further, in the embodiment of FIG. 9, the tapered portions 11c, 12c may be omitted from the coupler hole 11 and the tip 12. As in the case of FIG. 9, the coupler pin 23 fully engages the coupler hole 11 after provisionally engaging.

Figure 10:
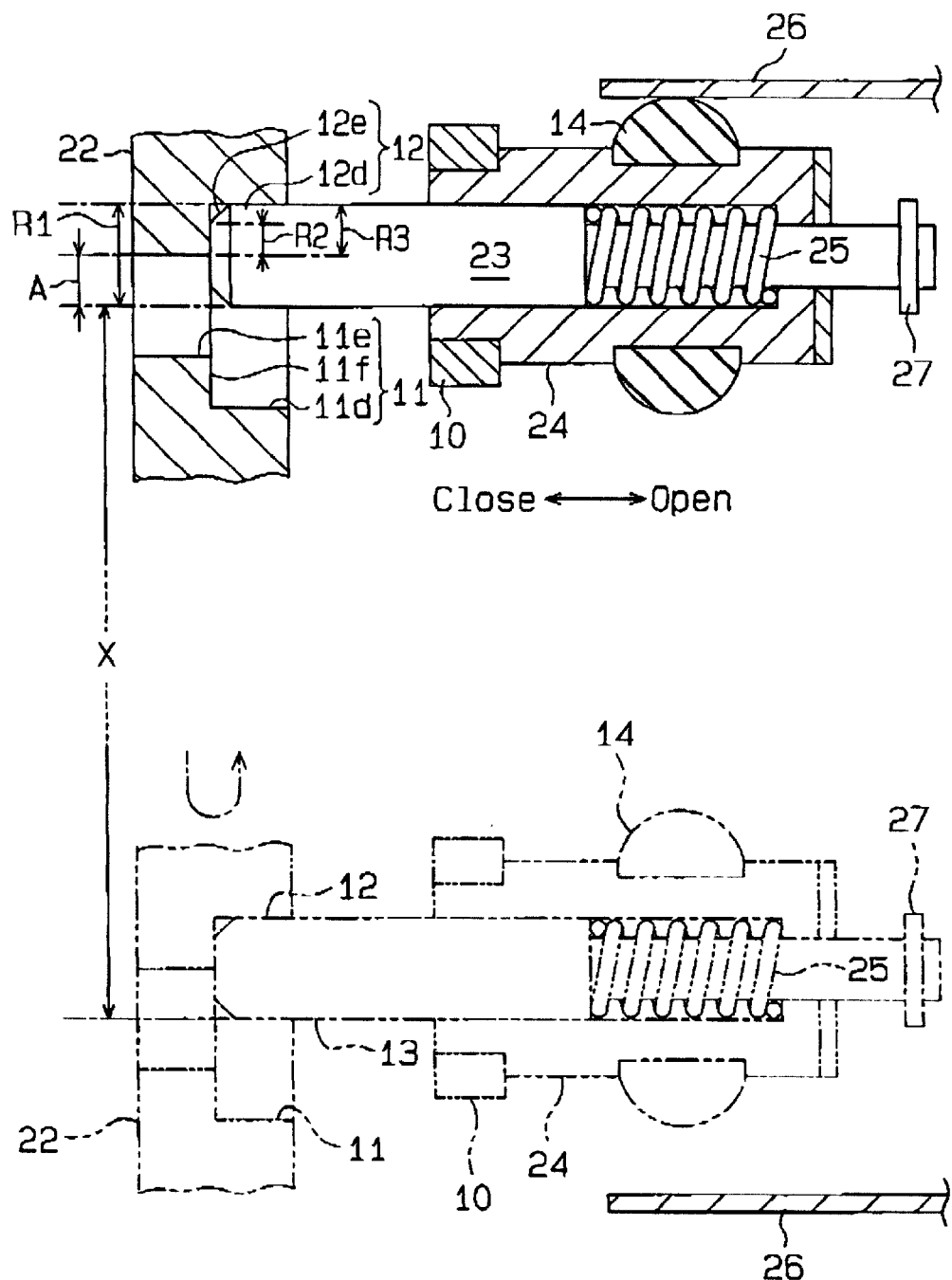
FIG. 10 is an enlarged partial cross-sectional view illustrating a coupler pin and a coupler hole of a wiper device according to a fourth embodiment of the present invention.

FIG. 10 illustrates a wiper device according to a fourth embodiment of the present invention. The device of FIG. 10 is different from the devices of FIGS. 8 and 9 in the shape of the tip 12 and the shape of the coupler hole 11. AS shown in FIG. 10, the tip 12 includes a cylindrical portion 12d and a tapered portion 12e. The diameter of the cylindrical portion 12d is the same as that of the pin 23. The coupler hole 11 includes a large diameter portion 11d and the small diameter portion 11e. the diameter of the small diameter portion 11e is substantially the same as that of the cylindrical portion 12d of the tip 12. A step 11f is defined between the large diameter portion 11d and the small diameter portion 11e.

The distance A of the device shown in FIG. 10 is smaller than the distance calculated by subtracting the radius R2 of the end face of the tip 12 from the radius R1 of the opening of the coupler hole 11, or the radius of the large diameter portion 11d. More preferably, the distance A is smaller than the distance calculated by subtracting the radius R3 of the cylindrical portion 12d from the radius R1 of the large diameter portion 11d. If the displacement between the coupler pin 23 and the coupler hole 11 is within the distance A, the coupler pin 23 will be guided to fully enter the coupler hole 11.

The device of FIG. 10 operates in substantially the same manner as the device of FIG. 9. That is, if the rear window 8 is closed with the rubber cushion 14 contacting one of the limit plates 26, the tapered portion 12e of the tip 12 enters the large diameter portion 11d of the coupler hole 11 and the end face of the tip 12 contacts the step 11f. If the rear window 8 is further moved in the closing direction, the coupler pin 23, which is contacting the step 11f as shown in FIG. 10, is moved axially relative to the pin holder 24 while the spring 25 contracts. Then, the axial position of the coupler pin 23 relative to the pivot disk 22 remains as pictured in FIG. 10 during a provisional engagement.

When the wiper device is activated in the state of FIG. 10, the actuator 1 rotates the pivot disk 22 in one direction (downward as viewed in FIG. 10). While being engaged with the step 11f, that is, while provisionally engaged with the coupler hole 11, the coupler pin 23 pivot integrally with the pivot disk 22. However, when the rotational direction of the pivot disk 22 is reversed as illustrated by broken lines in FIG. 10, the coupler hole 11 is moved relative to the coupler pin 23 so that the axis of the coupler hole 11 approaches the axis of the coupler pin 23. As a result, the coupler pin 23 is fully fitted in the coupler hole 11 by the force of the spring 25.

Figure 11:
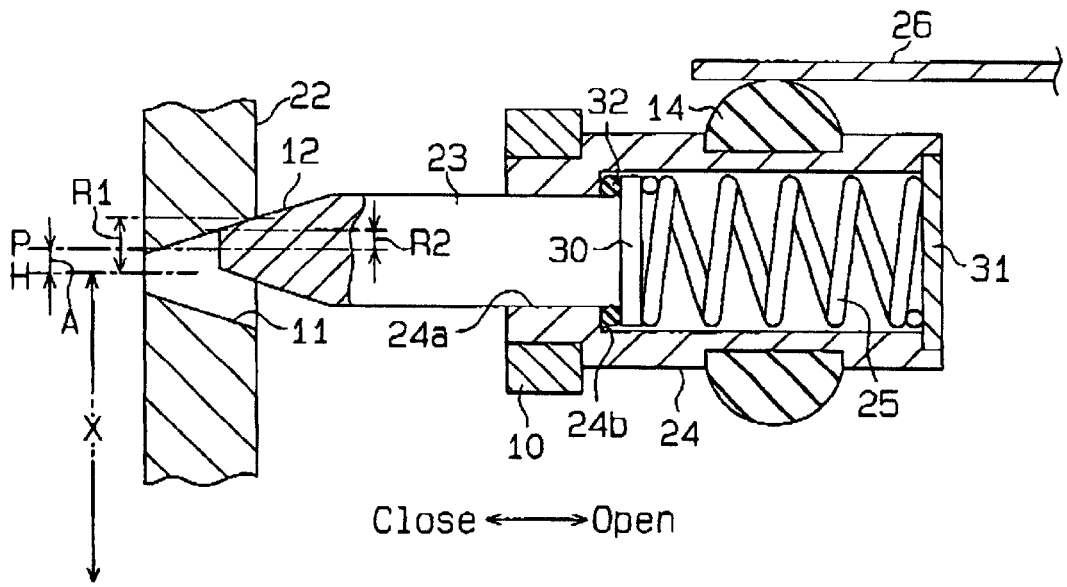
FIG. 11 is an enlarged partial cross sectional view illustrating a coupler pin of a wiper device according to a fifth embodiment of the present invention.
Figure 12:
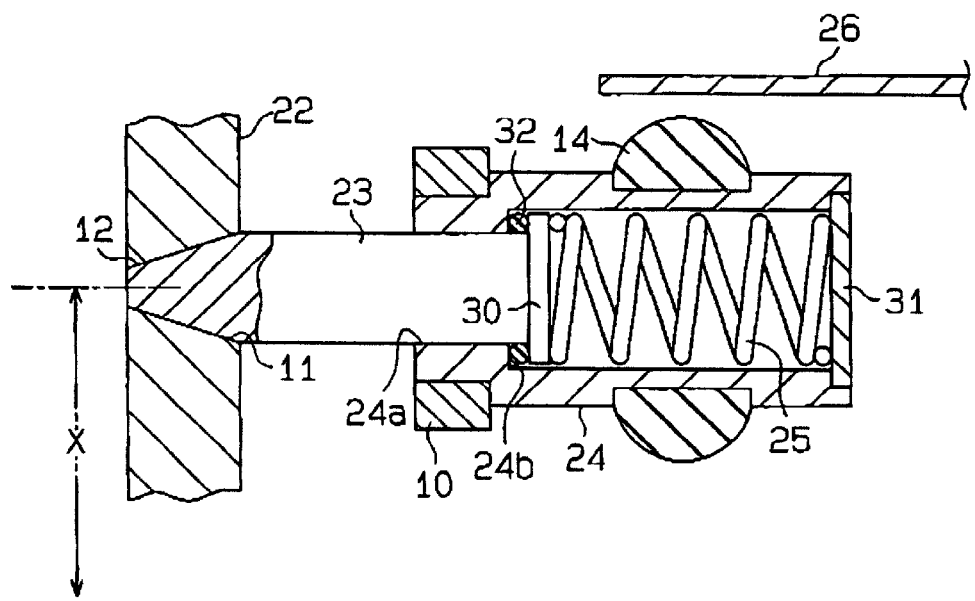
FIG. 12 is an enlarged partial cross-sectional view when the coupler pin of FIG. 11 is fully inserted in the coupler hole.

FIGS. 11 and 12 illustrate a wiper device according to a fifth embodiment of the present invention. The device of FIGS. 11 and 12 is different from the devices of FIGS. 1 to 8 in that the proximal end of the coupler pin 23 does not protrude from the pin holder 24. That is, as shown in FIGS. 11 and 12, one end of the cylindrical pin holder 24 opposite from the coupler pin 23 is covered by a plate lid 31. The coupler pin 23 is supported by a support hole 24a formed in the proximal end of the pin holder 24 to be movable in the axial direction. The proximal end of the coupler pin 23 is housed in the pin holder 24 and does not protrude from the pin holder 24.

A flange 30 is formed in the proximal end of the coupler pin 23. The spring 25 extends between the flange 30 and the lid 31 to urge the coupler pin 23 toward the pivot disk 22. A step 24b is formed near the proximal end of the pin holder 24. The flange 30 engages the step 24b, which prevents the coupler pin 23 from being dislocated from the pin holder 24.

An elastic body, which is an annular rubber cushion 32 in this embodiment, is located between the step 24b and the flange 30. The rubber cushion 32 prevents the flange 30 from contacting step 24b thereby reducing shock and noise. The rubber cushion 32 may be attached to the step 24b or to the flange 30.

Other than the differences described above, the device of FIGS. 11 and 12 is the same as the devices shown in FIGS. 1 to 8. The coupler pin 23 may be fully engaged with the coupler hole 11 without provisionally engaging the hole 11 (see FIGS. 1 to 7). Alternatively, the coupler pin 23 may be fully engaged with the coupler hole 11 after provisionally engaging with the hole 11 (see FIG. 8).

In the device of FIGS. 11 and 12, the proximal end of the coupler pin 23 is accommodated in the pin holder 24 and does not protrude from the pin holder 24. The coupler pin 23 is retracted in the pin holder 24 while the spring 25 contracts. Therefore, there is no need to form a large space between the shaft holder 7 and the pin holder 24 (see FIG. 1) to permit the coupler pin 23 to protrude, which reduces the size of the wiper device.

The flange 30 is easily formed at the proximal end of the coupler pin 23 by, for example, cold forging. Compared to fitting a snap ring about the pin 23, the flange 30 facilitates the manufacture and reduces costs.

In the device of FIGS. 11 and 12, the shape of the tip 12 and the shape of the coupler hole 11 may be the same as those of the devices shown in FIGS. 9 and 10.

Figure 13:
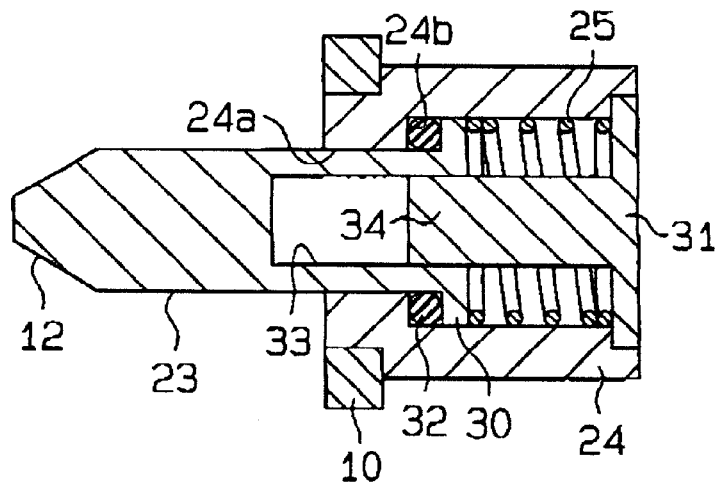
FIG. 13 is an enlarged partial cross sectional view illustrating a coupler pin of a wiper device of according to a sixth embodiment of the present invention.

FIG. 13 illustrates a device according to a sixth embodiment of the present invention. The device of FIG. 13 is a modification of the device of FIGS. 11 and 12. As shown in FIG. 13, the coupler pin 23 has a blind hole 33. The blind hole 33 extends axially and opens at the proximal end of the pin 23. The lid 31 has a guide shaft 34, which extends in the pin holder 24 along the axis of the pin holder 24. The guide shaft 34 is fitted in the blind hole 33. The coupler pin 23 is supported by the guide shaft 34, which prevents the pin 23 from tilting relative to the axis of the pin holder 24. In other words, the pin 23 reciprocates without being inclined.

Figure 14:
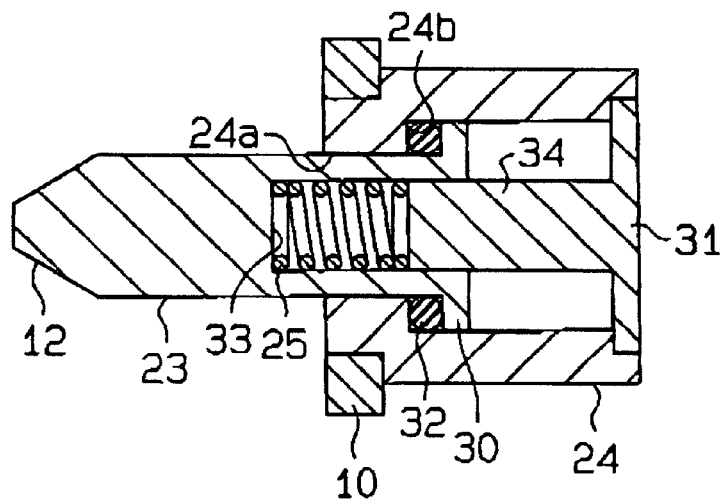
FIG. 14 is an enlarged partial cross sectional view illustrating a coupler pin of wiper device of according to a seventh embodiment of the present invention.

FIG. 14 illustrates a device according to a seventh embodiment of the present invention. The device of FIG. 14 is a modification of the device shown in FIG. 13. As shown in FIG. 14, the spring 25 is not located between the flange 30 and the lid 31 but between the bottom of the blind hole 33 and the end face of the guide shaft 34. The device of FIG. 14 operates in the same way as the device of FIG. 13 and has the same advantages.

An eighth embodiment of the present invention will now be described with reference to FIGS. 15 to 18. The differences from the embodiment of FIGS. 1 to 7 will mainly be discussed below, and like or the same reference numerals are given to those components that are like or the same as the corresponding components of the embodiment of FIGS. 1 to 7. In the embodiment of FIGS. 15 to 18, the coupler hole 11 includes a small portion 11g and a tapered portion 11h. The opening size of the tapered portion 11h increases toward the transmission unit 2.

Figure 15:
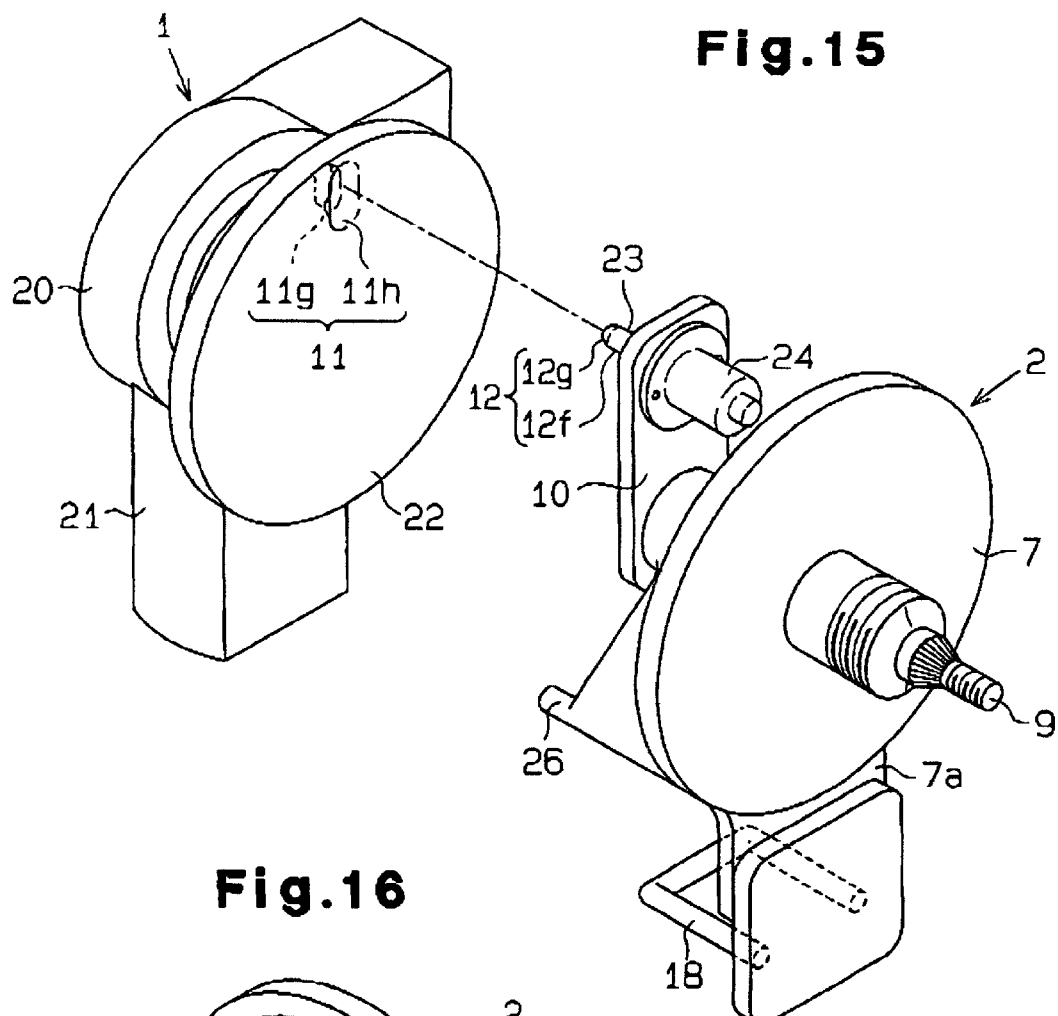
FIG. 15 is a perspective view illustrating a wiper device according to an eighth embodiment of the present invention.
Figure 16:
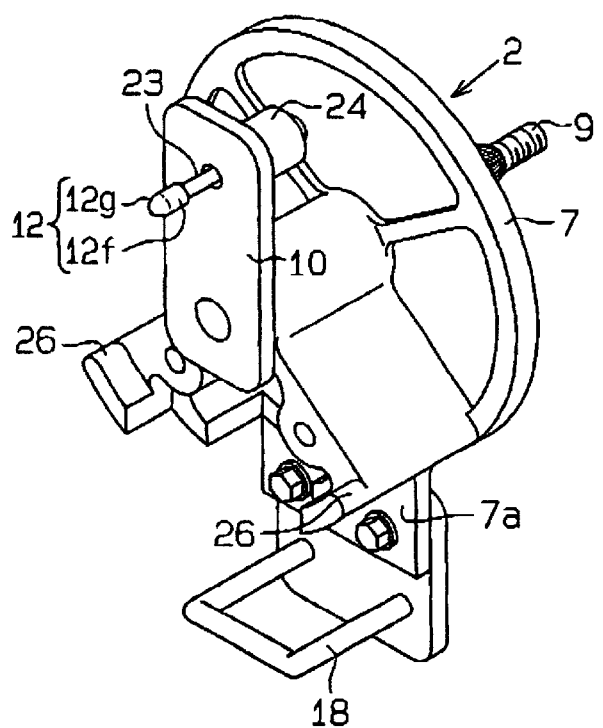
FIG. 16 is a rear perspective view showing the transmission unit of FIG. 15.

As shown in FIGS. 15 and 16, a pair of limit plates 26 are formed on the shaft holder 7 to contact the crank lever 10. When the crank lever 10 contacts one of the limit plates 26, the crank lever 10 (or the coupler pin 23) cannot be rotated further.

Figure 17:
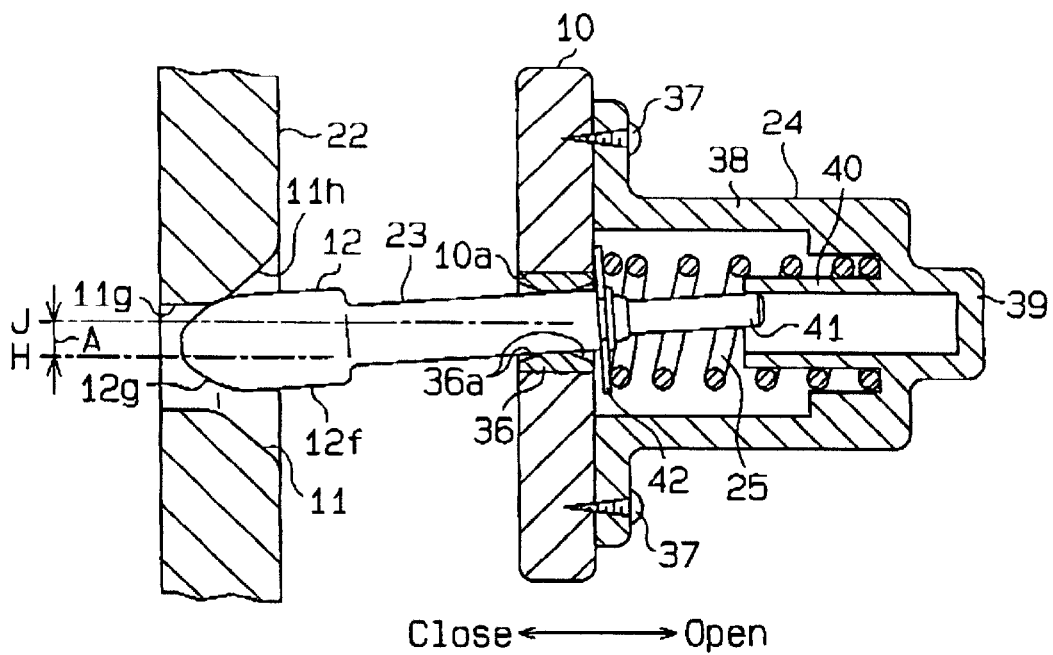
FIG. 17 is an enlarged partial cross-sectional view mainly illustrating the coupler pin and the coupler hole of the wiper device shown in FIG. 15.
Figure 18:
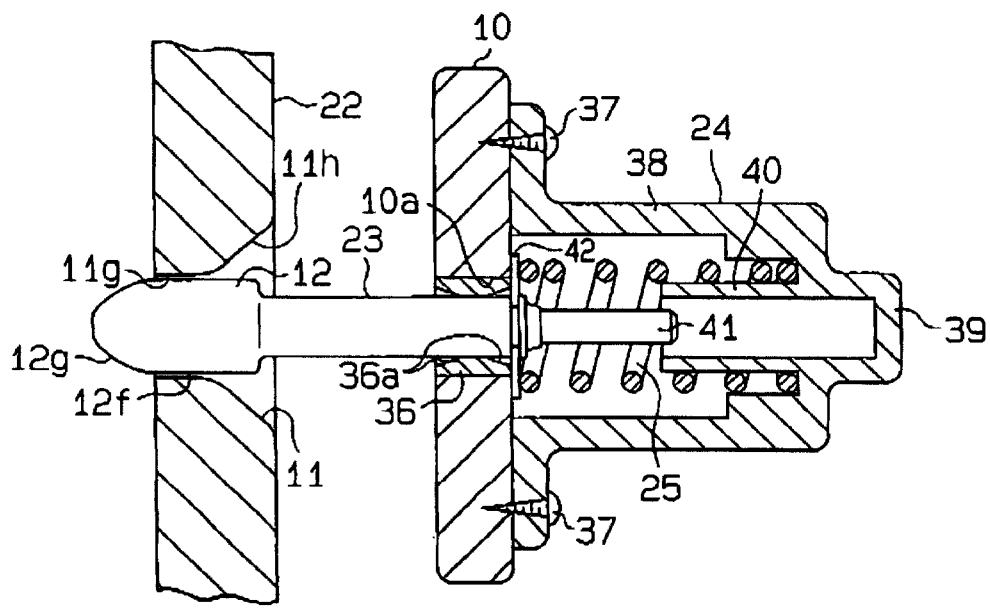
FIG. 18 is an enlarged partial cross-sectional view when the coupler pin is fully inserted in the coupler hole of FIG. 17.

As shown in FIGS. 17 and 18, the crank lever 10 has a through hole 10a through which the coupler pin 23 extends. A support, which is a cylindrical bearing 36 in this embodiment, is press fitted in the through hole 10a. Tapered surfaces 36a are formed on the inner surface of the bearing 36 such that the diameter of the bearing 36 increases from the axial center toward both ends. The bearing 36 is made of porous sintered alloy and the pores are filled with lubricant oil. That is, the bearing 36 is an oilless bearing.

The pin holder 24 is fixed to the crank lever 10 by screws 37. The pin holder 24 includes a main cylinder 38, a small cylinder 39 and a guide cylinder 40. The small cylinder 39 protrudes from the distal end of the main cylinder 38. The guide cylinder 40 extends axially from the inner end of the small cylinder 39 to the interior of the main cylinder 38. Since the crank lever 10 contacts the limit plates 26 in this embodiment, the pin holder 24 does not have a rubber cushion.

The coupler pin 23 is supported by the bearing 36 to tilt and move axially relative to the bearing 36. The coupler pin 23 has a limit shaft 41 formed at its proximal end. A stopper, which is a limit ring 42 in this embodiment, is fitted to the proximal end of the limit shaft 41. The diameter of the limit ring 42 is larger than the diameters of the through hole 10a and the guide cylinder 40. Therefore, the coupler pin 23 is permitted to move axially between where the limit ring 42 contacts the crank lever 10 and where the limit ring 42 contacts the guide cylinder 40.

The limit shaft 41 extends into the guide cylinder 40 such that at least part of the shaft 41 always remains in the guide cylinder 40. The inclination of the limit shaft 41 is limited by contact between the limit shaft 41 and the inner wall of the guide cylinder 40. The spring 25 in the pin holder 24 urges the coupler pin 23 through the limit ring 42. The force of the spring 25 normally keeps the coupler pin 23 coaxial with the pin holder 24 (or the axis J of the bearing 36) with the limit ring 42 contacting the crank lever 10.

The tip 12 of the coupler pin 23 includes a large diameter portion 12f and a tapered portion 12g. The diameter of the large diameter portion 12f is larger than the diameter of the rest of the coupler pin 23. The diameter of the tapered portion 12g decrease toward the distal end. The tapered portion 12g is curved in the axial direction. The diameter of the large diameter portion 12f is slightly smaller than the diameter of the small portion 11g of the coupler hole 11.

When the crank lever 10 contacts one of the limit plates 26, the untitled coupler pin 23 is located outside the end of the pivot range X of the coupler hole 11. Specifically, the coupler pin 23 is displaced from the end of the range X by a predetermined distance A. In other words, the limit plate 26 prevents the axis of the untitled coupler pin 23 from being displaced form the range X by a distance greater than the distance A.

If the rear window 8 is shut with the coupler pin 23 displaced from the coupler hole 11 by a distance greater than the distance A, the coupler pin 23 contacts the pivot disk 22 as in the embodiment of FIGS. 1 to 7. The coupler pin 23 is retracted against the force of the spring 25. When the coupler pin 23 is displaced from the coupler hole 11 by a distance greater than the distance A, the coupler pin 23 is in the range X of the coupler hole 11.

If the pivot disk 22 is rotated in this state, the coupler pin 23 enters the coupler hole 11 due to the force of the spring 25 when the coupler hole 11 becomes aligned with the coupler pin 23 (see FIG. 18). Therefore, the crank lever 10 is coupled to the pivot disk 22.

In FIG. 17, the coupler pin 23 is displaced from the coupler hole 11 by the distance A. That is, the axis J of the bearing 36 is displaced from the axis H of the coupler hole 11 by the distance A. If the rear window 8 is closed in this state, the distal end of the coupler pin 23 enters the tapered portion 11h of the coupler hole 11. After the distal end of the coupler pin 23 slides on the tapered portion 11h, the coupler pin 23 reaches the small portion 11g of the coupler hole 11 while being inclined relative to the axis J of the bearing 36. Consequently, the crank lever 10 is operably coupled to the crank lever 10.

The coupler pin 23 normally becomes perpendicular to the crank lever 10 as the wiper device operates. If the coupler pin 23 continues to be inclined, the coupler pin 23 becomes perpendicular to the crank lever 10 by the force of the spring 25 when the rear window 8 is opened.

As described above, the coupler pin 23 can be tilted. If the coupler pin 23 is displaced from the coupler hole 11, the coupler pin 23 smoothly enters the coupler hole 11 as the rear window 8 is closed.

The coupler pin 23 may be radially displaced from the coupler hole 11 due to errors produced when machining and assembling the parts. However, since the coupler hole 11 is an elongated hole that extends in the radial direction of the pivot disk 22, the coupler pin 23 is smoothly guided by the coupler hole 11 when the rear window 8 is closed. In other words, the elongated coupler hole 11 does not require high manufacture and assembly accuracy, which facilitates the machining and assembly of the wiper device.

In the embodiment of FIGS. 15 to 18, the tapered portion 11h may be omitted from the coupler hole 11. That is, the coupler hole 11 may be cylindrical. Alternatively, the tip 12 of the coupler pin 23 may be cylindrical without the tapered portion 12g. That is, the device operates if one of the coupler hole 11 and the coupler pin 23 has a tapered portion.

A ninth embodiment according to the present invention will now be described with reference to FIGS. 19 to 24(b). The differences from the embodiment of FIGS. 1 to 7 will mainly be discussed below, and like or the same reference numerals are given to those components that are like or the same as the corresponding components of the embodiment of FIGS. 1 to 7. In the embodiment of FIGS. 19 to 24(b), the structure for guiding the coupler pin 23 into the coupler hole 11 when the pin 23 is displaced from the hole 11 is different from the above embodiments.

Figure 19:
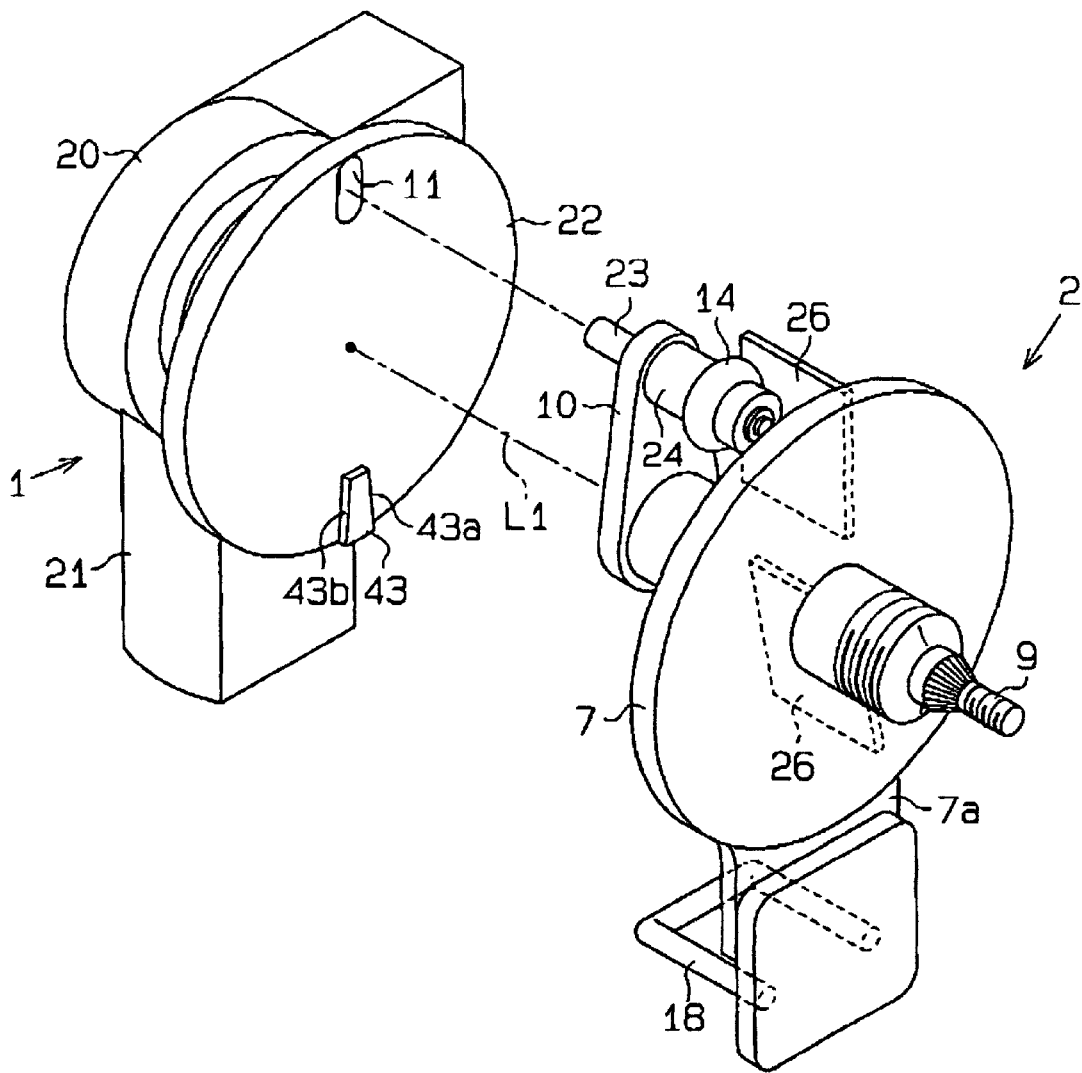
FIG. 19 is a perspective view illustrating a wiper device according to a ninth embodiment of the present invention.

As shown in FIG. 19, the distal end of the coupler pin 23 is cylindrical as in the prior art device of FIGS. 25 to 28. Also, the coupler hole 11 is an elongated hole that has no tapered portion. The coupler hole 11 extends in the radial direction of the pivot disk 22. The width of the hole 11 in the circumferential direction of the pivot disk 22 is slightly greater than the diameter of the coupler pin 23.

Figure 20A:
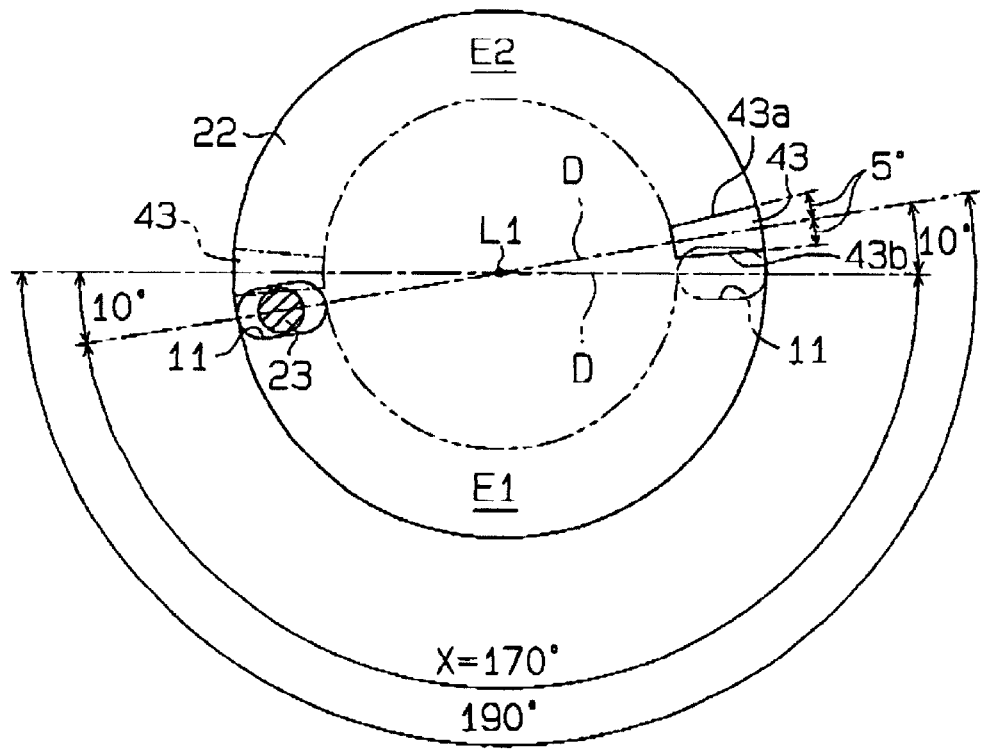
FIGS. 20(a) and 20(b) are diagrammatic views showing the operation of the wiper device of FIG. 19, when the coupler pin is inserted in the coupler hole.
Figure 20B:
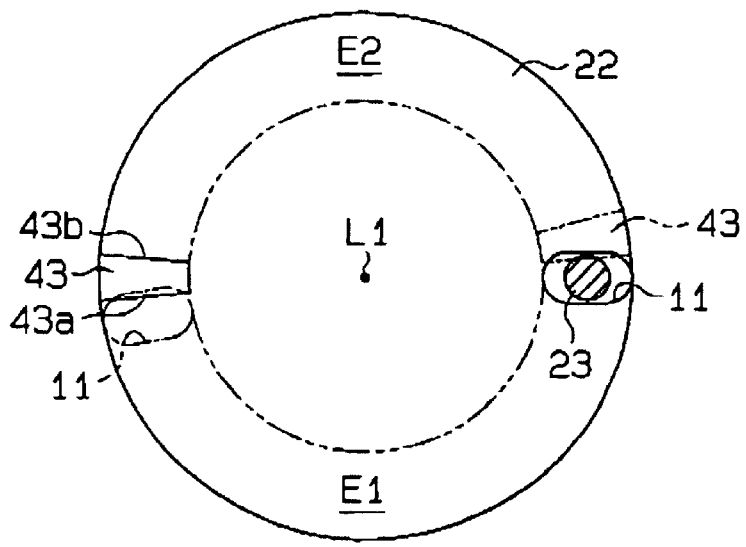

In the device of FIGS. 19 to 24(b), the pivot angle range X of the coupler hole 11 is one hundred seventy degrees (see FIG. 20(a)). The limit plates 26 define the pivot range of the coupler pin 23 to a hundred ninety degrees. When the rubber cushion 14 contacts one of the limit plates 26, the coupler pin 23 is displaced from the end of the pivot range X of the coupler hole 11, for example, by ten degrees.

As illustrated in FIG. 19, a guide projection 43 is formed on the surface of the pivot disk 22. The guide projection 43 is angularly spaced from the coupler hole 11 by a hundred eighty degrees about the axis L1 the pivot disk 22. As shown in FIG. 20(a), the length of the guide projection 43 in the radial direction of the pivot disk 22 is substantially the same as the radial length of the coupler hole 11. The circumferential center of the guide projection 43 and the circumferential center of the coupler hole 11 are on the same line D, which includes the axis L1 of the pivot disk 22.

In the embodiment of FIGS. 19 to 24(b), first and second sides 43a, 43b of the guide projection 43 are inclined relative to the line D by five degrees. That is, the first and second sides 43a, 43b are separated by ten degrees about the axis L1 of the pivot disk 22.

Figure 21:
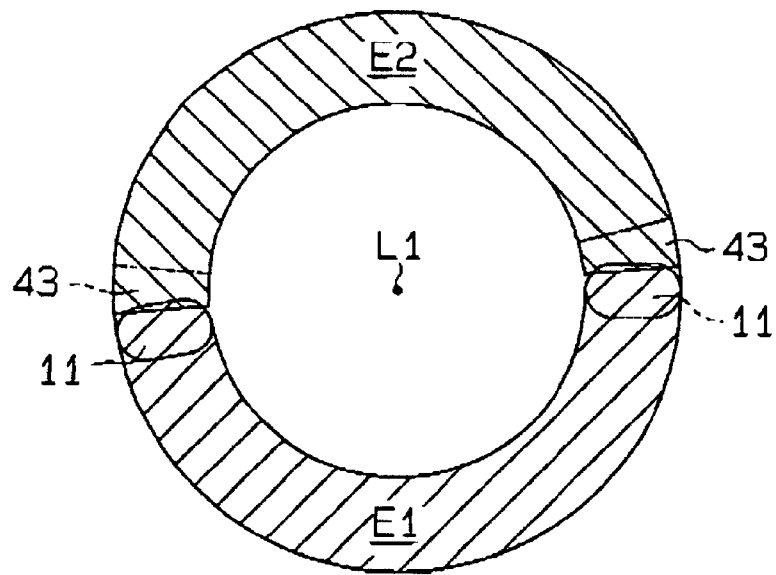
FIG. 21 is a diagrammatic view showing the paths of the coupler hole and the guide projection of the wiper device shown in FIG. 19.

FIG. 21 shows the path E1 of the coupler hole 11 and the path E2 of the guide projection 43 by shading having different inclinations. The path E1 and the path E2 do not overlap with each other but cover the entire circumference of the pivot disk 22.

Solid lines in FIG. 20(a) illustrate a state in which the coupler pin 23 is fitted in the coupler hole 11 and the coupler hole 11 is located at one end of the range X. The wiper device is normally stopped when the coupler hole 11 is located at one of the ends of the range X, or at an initial position. If the device is activated, the coupler pin 23, together with the coupler hole 11, is reciprocated between the initial position, which is illustrated by solid lines in FIG. 20(a) and a reverse position, which is illustrated by solid lines in FIG. 20(b). In other words, the coupler pin 23 is reciprocated by a hundred seventy degrees, or in the range X. As in the previous embodiments, the rubber cushion 14 does not collide with the limit plates 26.

When the rear window 8 is shut, the coupler pin 23 may be displaced from the coupler hole 11, which is at the initial position. The operation of the device in this state will now be described.

Figure 22:
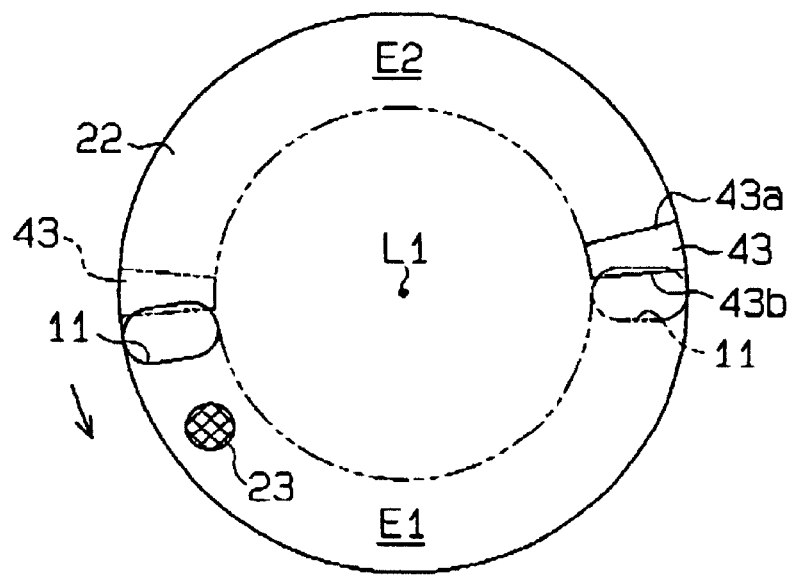
FIG. 22 is a diagrammatic view showing that the coupler pin is located on the path of the coupler hole.

FIG. 22 illustrates a state where the coupler pin 23 is displaced from the coupler hole 11 in the path E1 of the coupler hole 11. If the rear window 8 is shut in this state, the coupler pin 23 contacts the pivot disk 22 as in the embodiment of FIGS. 1 to 7. The coupler pin 23 is retracted against the force of the spring 25. As the wiper device is activated, the pivot disk 22 is rotated. When the coupler pin 23 passes by the coupler hole 11, the force of the spring 25 causes the coupler pin 23 to enter the coupler hole 11.

Figure 23A:
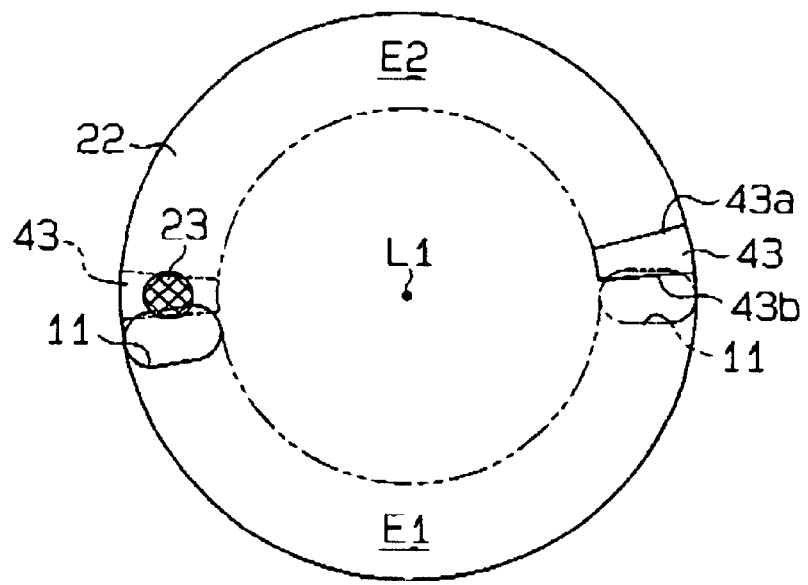
FIGS. 23(a) and 23(b) are diagrammatic views showing the operation of the wiper device shown in FIG. 19 when the coupler pin is displaced from the path of the coupler hole.
Figure 24A:
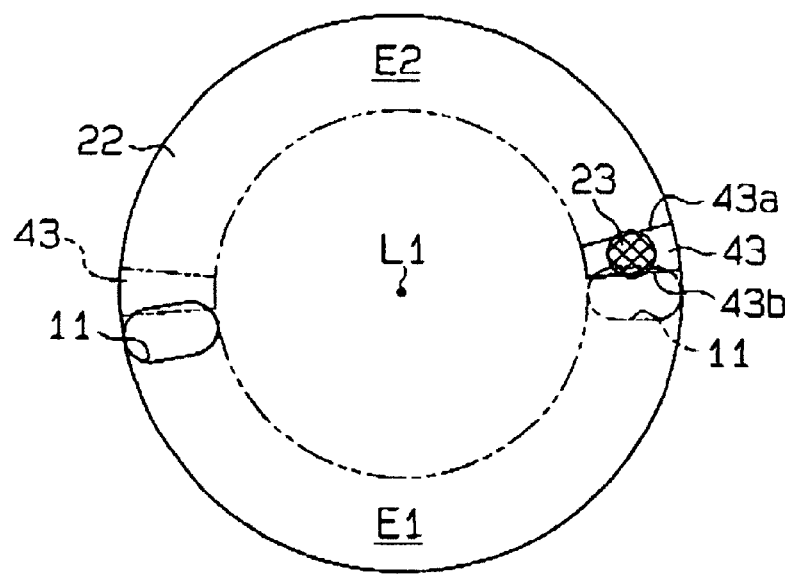
FIGS. 24(a) and 24(b) are diagrammatic views showing the operation of the wiper device shown in FIG. 19 when the coupler pin is displaced from the path of the coupler hole.

FIGS. 23(a) and 24(a) illustrate a state where the coupler pin 23 is out of the path E1 of the coupler hole 11. In these states, the coupler pin 23 is located in the path E2 of the guide projection 43.

In FIG. 23(a), the coupler pin 23 is located outside the range of the coupler hole 11, which is at the initial position. If the rear window 8 is shut in this state, the coupler pin 23 contacts the pivot disk 22 and retracts. When the pivot disk 22 starts rotating due to activation of the wiper device, the coupler hole 11 is moved from the initial position to the reverse position.

Figure 23B:
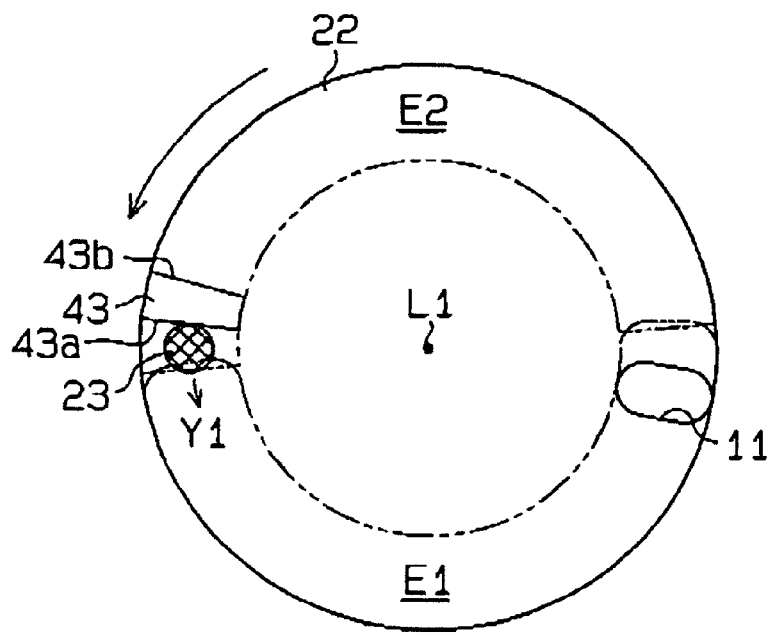

The first side 43a of the guide projection 43 engages the coupler pin 23 immediately before the coupler hole 11 reaches the reverse position as shown in FIG. 23(b), which moves the coupler pin in a direction Y1. When the coupler hole 11 reaches the reverse position, the first side 43a moves the coupler pin 23 to a position within the path E1 of the coupler hole 11, that is, to the initial position. Therefore, when the coupler hole 11 returns to the initial position from the reverse position, the coupler pin 23 enters the coupler hole 11 by the force of the spring 25, which couples the crank lever 10 with the pivot disk 22.

In FIG. 24(a), the coupler pin 23 is located outside the range of the coupler hole 11, which is at the reverse position. If the rear window 8 is shut, the coupler pin 23 contacts the guide projection 43 and retracts. If the wiper device is activated, the pivot disk 22 is rotated. Accordingly, the coupler hole 11 is moved from the initial position to the reverse position. At this time the guide projection 43 is separated from the coupler pin 23 and the coupler pin 23 contacts the pivot disk 22. After reaching the reverse position, the coupler hole 11 moves back to the initial position.

Figure 24B:
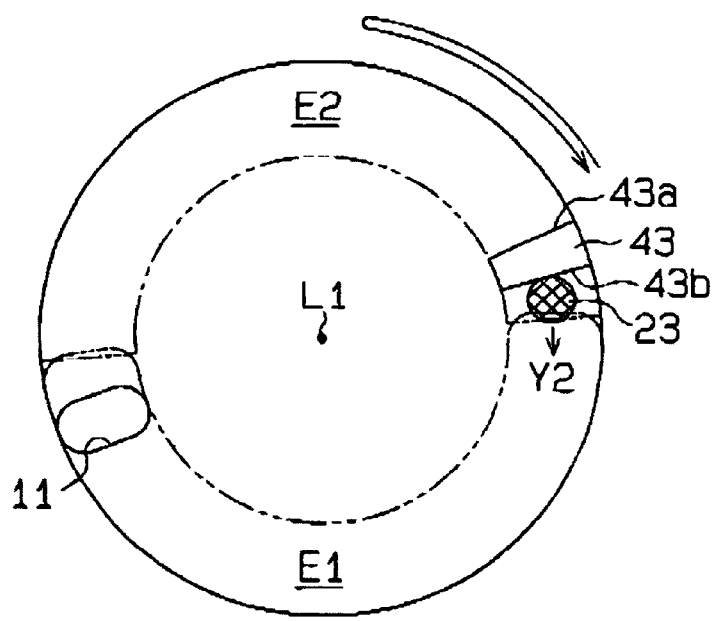
Figure 25:
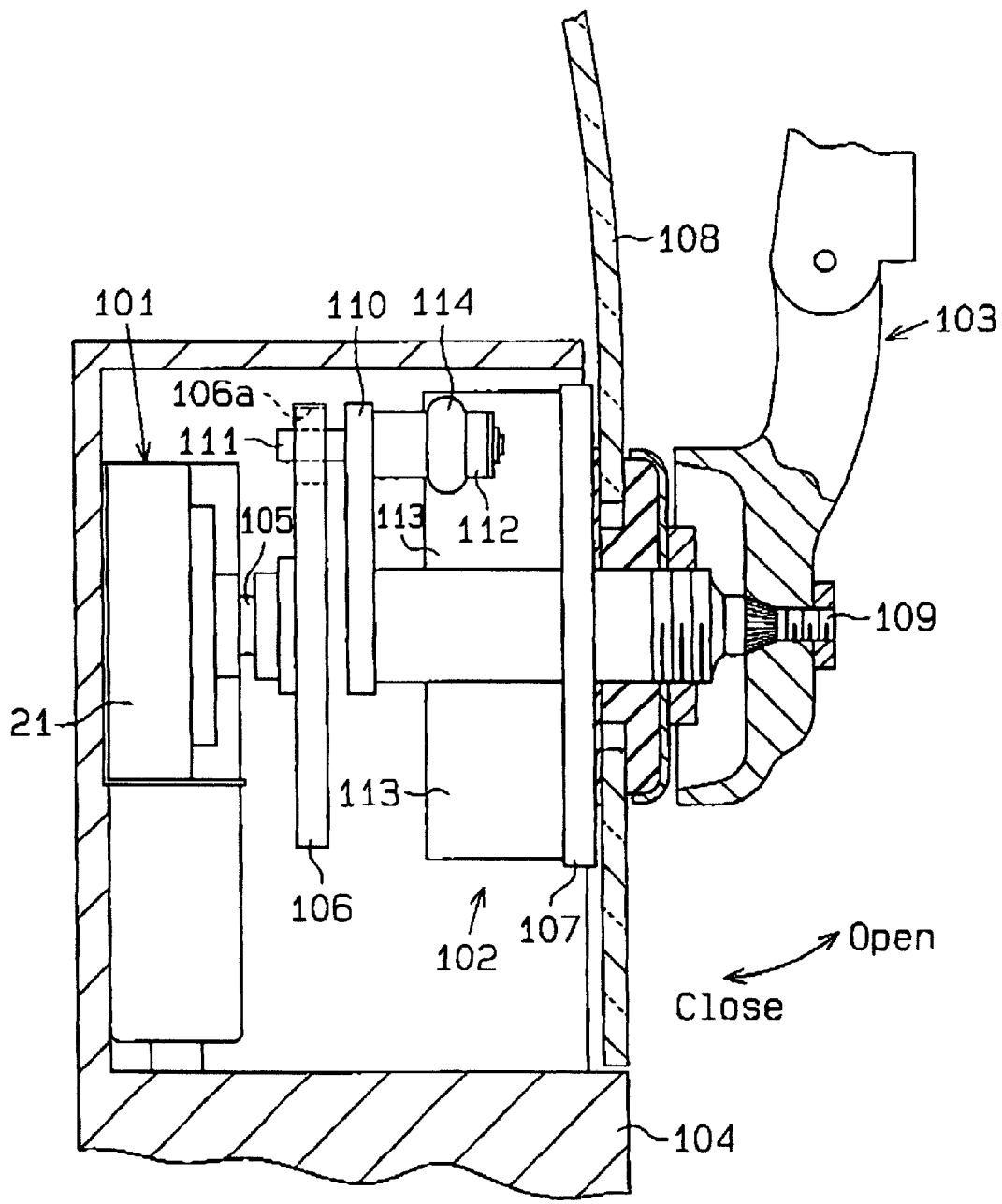
FIG. 25 is cross-sectional view illustrating a prior art wiper device.
Figure 26:
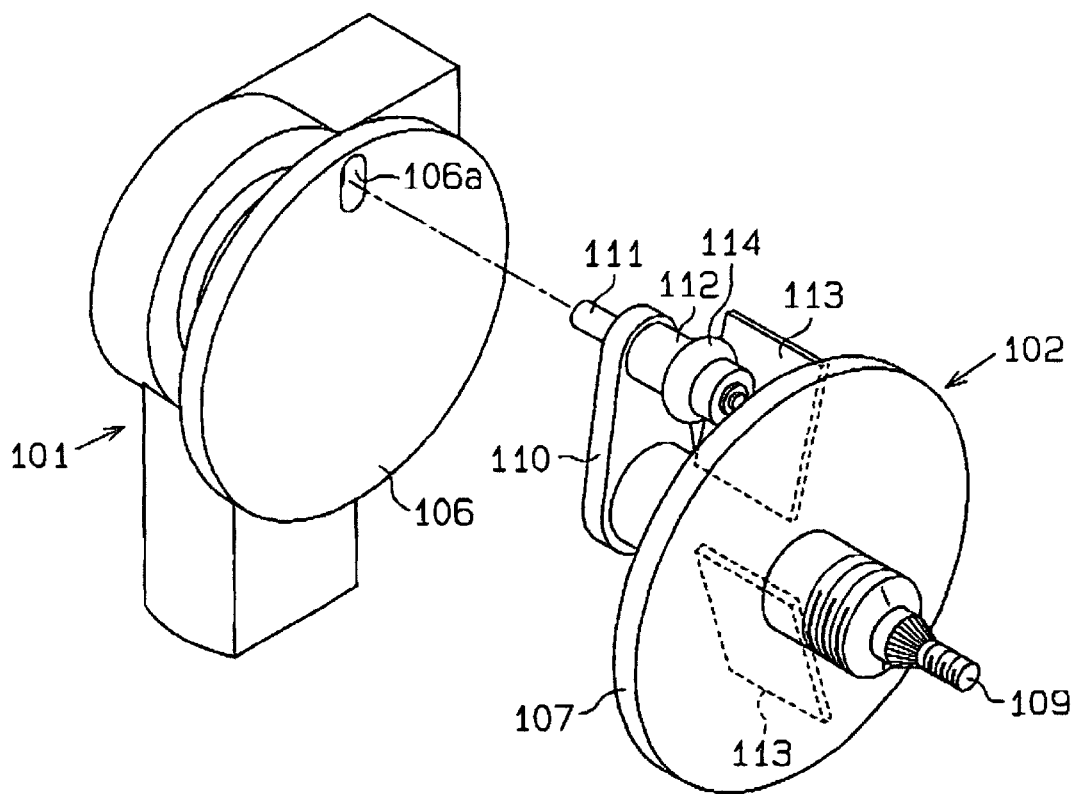
FIG. 26 is a perspective view illustrating the wiper device of FIG. 25.
Figure 27:
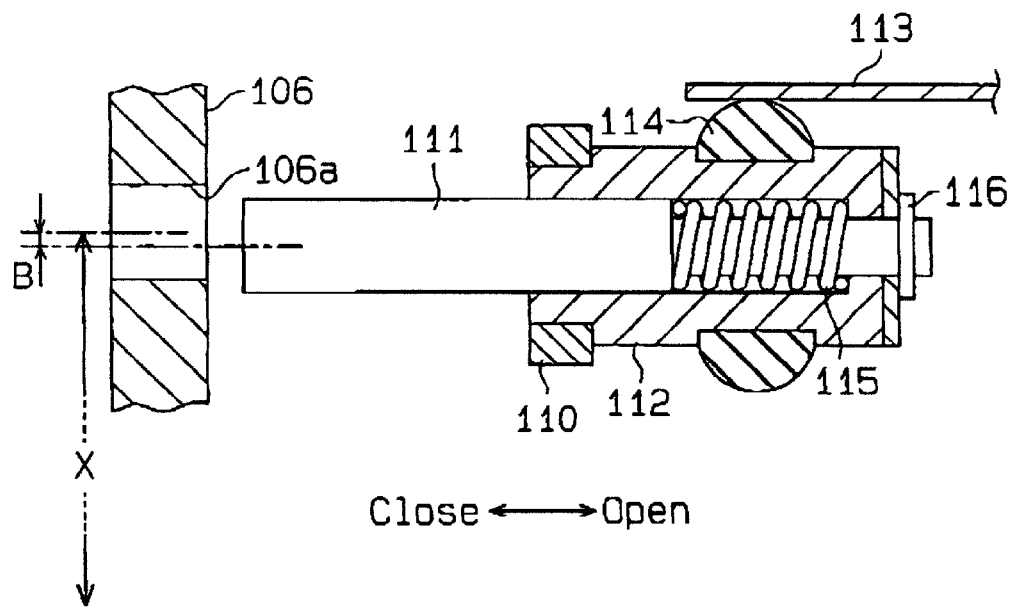
FIG. 27 is an enlarged partial cross-sectional view showing the wiper device of FIG. 25, when the rubber cushion contacts one of the limit plate.
Figure 28:
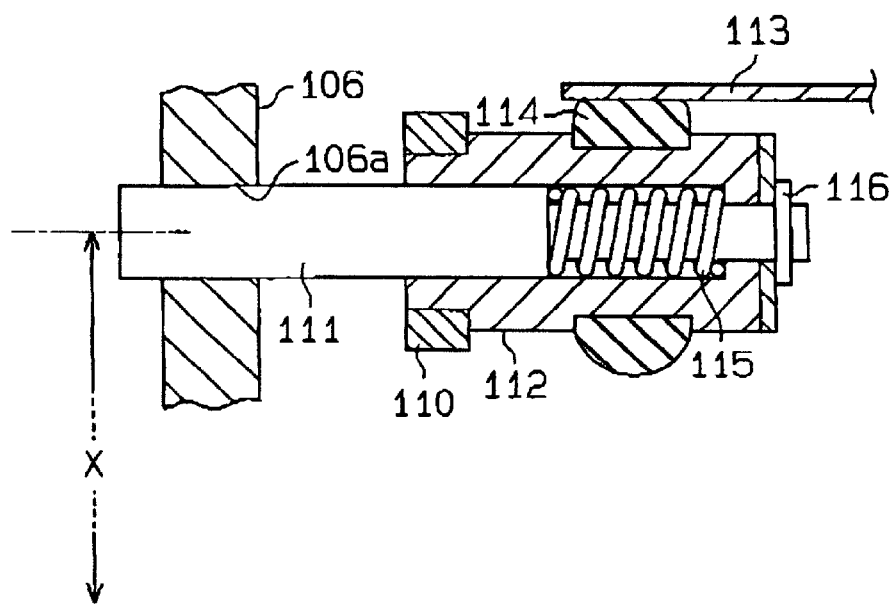
FIG. 28 is an enlarged partial cross-sectional view showing the wiper device of FIG. 25, when the coupler pin is inserted into the coupler hole.

The second side 43b of the guide projection 43 engages the distal end of the coupler pin 23 immediately before the coupler hole 11 reaches the initial position as shown in FIG. 24(b), which moves the coupler pin 23 in a direction of arrow Y. When the coupler hole 11 reaches the initial position, the second side 43b moves the coupler pin 23 to a position within the path E1 of the coupler hole 11, that is, to the reverse position. Thus, when the coupler hole 11 moves from the initial position to the reverse position next time, the coupler pin 23 enters the coupler hole 11 by the force of the spring 25, which couples the crank lever 10 with the pivot disk 22.

As described above, the guide projection 43 is formed on the pivot disk 22 to adjust the position of the coupler pin 23. That is, the guide projection 43 moves the coupler pin 23 from a position where the pin 23 cannot enter the hole 11 to a position where the pin 23 can enter the hole 11. The structure of FIGS. 20 to 24(b) has the same advantages as the embodiments of FIGS. 1 to 19.

The circumferential width of the guide projection 43 and the angle of the guide projection 43 relative to the coupler hole 11 are determined in accordance with the pivot range X of the coupler hole 11 and with the pivot range of the coupler pin 23 defined by the limit plates 26. The projection 43 is formed in such that the path E2 of the guide projection 43 is included in a circle including the path E1 of the coupler hole 11 and at least covers the area other than the path E1. The path E2 of the guide projection 43 may overlap the path E1 of the coupler hole 11. If the guide projection 43 is changed in accordance with the range X of the coupler hole 11, the guide projection 43 can always be located at a position to engage the coupler pin 23 with the coupler hole 11.

The guidance structure of FIG. 19 to 24(b) may be modified as long as the coupler pin 23 is moved from the outside the path E1 of the coupler hole 11 to a position inside the path E1. For example, the structure may include a guide member that rotates integrally with the output shaft and an engagement member that rotates integrally with the pivot shaft 9. In this case, the engagement member is formed separated from the coupler pin 23. As the wiper device is activated, the guide member rotates the engagement member thereby guiding the coupler pin 23 to a position within the path E1.

The embodiments of FIGS. 1 to 24(b) may be modified as follows.

The spring 25 for urging the coupler pin 23 toward the pivot disk 22 may be replaced by other urging members such as rubber.

The coupler pin 23 may be fixed to the crank lever 10 and the crank lever 10 may be axially movable relative to the pivot shaft 9. In this case, the crank lever 10 is urged toward the pivot disk 22 by an urging member (for example, a spring).

The coupler pin 23 may be fixed to the crank lever 10 and the pivot disk 22 may be supported by the pin 23 to be movable relative to the output shaft 5. In this case, the pivot disk 22 is urged toward the coupler pin 23 by an urging member (for example, a spring).

In the embodiments illustrated in FIGS. 1 to 24(b), the coupler opening, which is the coupler hole 11, is formed in the actuator 1, and the engagement projection, which is the coupler pin 23, is formed in the power transmission unit 2. Alternatively, the coupler opening may be formed in the unit 2 and the projection may be formed on the pivot shaft 9. In this case, the first coupler, which is the pivot disk 22, is fixed to the pivot shaft 9. The second coupler having the engagement projection, or the crank lever 10, is preferably fixed to the output shaft 5. Also, the crank lever 10 may be replaced by a disk having the same function.

The devices of FIGS. 1 to 24(*b*) have the rear door 4 and the rear window 8, which closes the opening of the door 4. The wiper device is located between the rear door 4 and the rear window 8. However, the present invention of any illustrated embodiment may be applied to any type of wiper device as long as the device has a support, which is the door 4 in the illustrated embodiments, and a window that opens and closes an opening formed in the support. The support is not limited to a vehicle body and the window is not limited to a glass window.

The present examples and embodiments are to be considered as illustrative and not restrictive and the invention is not to be limited to the details given herein, but may be modified within the scope and equivalence of the appended claims.

What is claimed is:

1. A wiper device for wiping a window supported by a support, the wiper device being located between the window and the support, wherein the window opens and closes an opening in the support, the wiper device comprising:
    an actuator supported by the support, the actuator having an output shaft;
    a first coupler attached to the output shaft, wherein the actuator pivots the first coupler in a first angle range;
    a pivot shaft rotatably supported by the window, wherein, when the window is closed, the axis of the pivot shaft is alighted with the axis of the output shaft;
    a second coupler attached to the pivot shaft, wherein, when the window is closed and the second coupler is at a predetermined rotational phase relative to the first coupler, the second coupler is coupled to the first coupler to transmit rotation of the output shaft to the pivot shaft;
    a wiper arm attached to the pivot shaft, wherein, when the actuator is activated with the second coupler coupled to the first coupler, the wiper arm pivots in an angle range corresponding to the first angle range;
    a limit member for limiting the angle range of the second coupler to a second angle range, the second angle range being greater than the first angle range; and
    a guidance structure, wherein, when the second coupler is outside the first angle range, the guidance structure guides the second coupler to the first angle range by mechanical engagement.

2. The wiper device according to claim 1, wherein each of two ends of the second angle range is outside the corresponding end of the first angle range.

3. The wiper device according to claim 2, wherein, when the actuator is stopped, the first coupler is normally located at an initial position, which is one end of the first angle range, and wherein, when the window is closed with the second coupler spaced from the initial position, the guidance structure rotates the second coupler to the initial position by engagement between the second coupler and the first coupler as the window is closed.

4. The wiper device according to claim 2, wherein one of the ends of the first angle range is an initial position at which the first coupler is located when the actuator is stopped, and the other end is a reverse position of the first coupler, wherein when the window is closed with the second coupler spaced from the initial position, the guidance structure provisionally couples the second coupler with the first coupler so that the second coupler rotates with the first coupler, and wherein, when the actuator causes the first coupler to reverse direction at the reverse position, the guidance structure fully couples the second coupler with the first coupler.

5. The wiper device according to claim 2, wherein the guidance structure includes a guide member, the guide member being rotated by the output shaft and being engageabe the second coupler, wherein, while the window is closed with the second coupler being outside the first angle range, the guide member rotates the second coupler to the first angle range as the actuator is activated.

6. The wiper device according to claim 1, wherein the first coupler includes a first engagement member, the first engagement member being radially spaced from the axis of the output shaft, and the second coupler includes a second engagement member, the second engagement member being radially spaced from the axis of the pivot shaft, and wherein, when the engagement members are engaged, the second coupler is coupled to the first coupler.

7. The wiper device according to claim 6, wherein one of the first and second engagement members is the wall of an opening and the other is a projection.

8. The wiper device according to claim 7, wherein the first coupler is a disk that is fixed to the output shaft, and the second coupler is a lever fixed to the pivot shaft, wherein the lever extends radially from the pivot shaft.

9. The wiper device according to claim 8, wherein the opening is formed in the disk, and the projection is formed on the lever.

10. The wiper device according to claim 7, wherein the opening is formed in the first coupler and the projection is formed on the second coupler.

11. The wiper device according to claim 10, wherein the guidance structure includes a guide member located in the first coupler, the guide member being engageabe with the projection, wherein, while the window is closed with the second coupler being outside the first angle range, the guide member is engaged with the projection as the actuator is activated such that the second coupler is moved to the first angle range.

12. The wiper device according to claim 7, wherein the guidance structure includes the opening and the projection.

13. The wiper device according to claim 12, wherein, when the actuator is stopped, the first coupler is normally located at an initial position, which is one end of the first angle range, and wherein, when the window is closed with the second coupler spaced from the initial position, the projection is engaged with and inserted into the opening to rotate the second coupler to the initial position.

14. The wiper device according to claim 12, wherein one of the ends of the first angle range is an initial position at which the first coupler is located when the actuator is stopped, and the other end is a reverse position of the first coupler, wherein, when the window is closed with the second coupler spaced from the initial position, part of the projection is engaged with and inserted into the opening such that the second coupler is provisionally coupled with the first coupler, and wherein, when the actuator causes the first coupler to reverse direction at the reverse position, the projection is fully inserted into the opening.

15. The wiper device according to claim 12, wherein the cross-sectional area of the projection decreases in the direction of the opening.

16. The wiper device according to claim 12, wherein the cross-sectional area of the opening increases in the direction of the projection.

17. The wiper device according to claim 12, wherein the opening includes a recess having a large portion and a small portion, wherein the projection enters the large portion before entering the small portion when the couplers are coupled.

18. The wiper device according to claim 17, wherein the diameter of the large portion is larger than the diameter of the projection, and wherein the diameter of the small portion is substantially the same as the diameter of the projection.

19. The wiper device according to claim 17, wherein the first and second couplers have a provisionally coupled position and a fully coupled position, such that, in the provisionally coupled position, a distal end section of the projection engages the large portion of the opening and, in the fully engaged position, the distal end section of the projection engages the small portion of the opening.

20. The wiper device according to claim 12, wherein the projection includes a large portion and a small portion, and wherein the small portion is closer to the distal end of the projection than the large portion.

21. The wiper device according to claim 20, wherein the diameter of the small portion is smaller than the diameter of the opening, and wherein the diameter of the large portion is substantially the same as the diameter of the opening.

22. The wiper device according to claim 20, wherein the first and second couplers have a provisionally coupled position and a fully coupled position, such that, in the provisionally coupled position, a small portion of the projection engages the opening and, in the fully engaged position, the large portion of the projection engages the opening.

23. The wiper device according to claim 7, wherein the opening includes an elongated hole extending radially relative to the rotational axis of the corresponding coupler.

24. The wiper device according to claim 7, wherein the projection is supported by the corresponding coupler to be axially movable, wherein an urging member urges the projection toward the opening.

25. The wiper device according to claim 7, wherein the projection is tiltably supported by the corresponding coupler.

26. The wiper device according to claim 25, wherein the projection is a pin, the wiper device further comprising:
   a support member to support the pin such that the pin is axially movable and tiltable;
   an urging member to urge the pin toward the opening; and
   a stopper to limit the range of movement of the pin in the axial direction, wherein when the window is opened, the urging member keeps the pin untilted.

27. A wiper device for wiping a window supported by a vehicle body, the wiper device being located between the window and the vehicle body, wherein the window opens and closes an opening in the vehicle body, the device comprising;
   an actuator supported by the vehicle body, the actuator having an output shaft;
   a pivot disk attached to the output shaft, the pivot disk having an opening, which is radially spaced from the axis of the output shaft, wherein the actuator pivots the pivot disk in a first angle range;
   a pivot shaft rotatably supported by the window, wherein, when the window is closed, the axis of the pivot shaft is aligned with the axis of the output shaft;
   a lever attached to the pivot shaft, the lever having a projection, which is radially spaced from the axis of the pivot shaft, wherein, when the window is closed and the projection is inserted into the opening, the lever is coupled to the pivot disk to transmit rotation of the output shaft to the pivot shaft, and wherein, when the window is opened, the projection is disengaged from the opening;
   a wiper arm attached to the pivot shaft, wherein, when the actuator is activated with the lever coupled to the pivot disk, the wiper arm pivots in an angle range corresponding to the first angle range;
   a limit member for limiting the angle range of the lever to a second angle range, the second angel range being greater than the first angle range, wherein each of two ends of the second angle range is outside the corresponding end of the first angle range; and
   a guidance structure, wherein, when the projection on the lever is outside the first angle range, the guidance structure guides the projection to the first angle range by mechanical engagement.

28. The wiper device according to claim 27, wherein, when the actuator is stopped, the opening is normally located at an initial position, which is one end of the first angle range, wherein the guidance structure includes the opening and the projection, and wherein, when the window is closed with the projection spaced from the initial position, the projection is engaged with and inserted into the opening thereby rotating to the initial position.

29. The wiper device according to claim 27, wherein one of the ends of the first angle range is an initial position at which the opening is located when the actuator is stopped, and the other end is a reverse position of the opening, wherein the guidance structure includes the opening and the projection, wherein, when the window is closed with the projection spaced from the initial position, part of the projection is engaged with and inserted into the opening such that the lever is provisionally coupled with the pivot disk, and wherein, when the actuator causes the opening to reverse direction at the reverse position, the projection is fully inserted into the opening.

30. The wiper device according to claim 27, wherein the cross-sectional area of the projection decreases in the direction of the opening.

31. The wiper device according to claim 27, wherein the cross-sectional area of the opening increases in the direction of the projection.

32. The wiper device according to claim 27, wherein the opening includes a recess having a large portion and a small portion, wherein the diameter of the large portion is larger than the diameter of the projection, and the diameter of the small portion is substantially the same as the diameter of the projection, and wherein the projection enters the large portion before entering the small portion when the lever is coupled with the pivot disk.

33. The wiper device according to claim 27, wherein the projection includes a large portion and a small portion, wherein the diameter of the small portion is smaller than the diameter of the opening, the diameter of the large portion is substantially the same as the diameter of the opening, and wherein the small portion is closer to the distal end of the projection than the large portion.

34. The wiper device according to claim 27, wherein the guidance structure includes a guide projection located on the pivot disk, the guide projection being engageable with the projection, wherein, while the window is closed with the projection being outside the first angle range, the guide projection is engaged with the projection as the actuator is activated such that the projection is moved to the first angle range.

35. The wiper device according to claim 27, wherein the projection is supported by the lever to be axially movable, wherein an urging member urges the projection toward the opening.

36. The wiper device according to claim 27, wherein the projection is tiltably supported by the lever.

37. The wiper device according to claim 36, wherein the projection is a pin, the wiper device further comprising:
   a support member to support the pin such that the pin is axially movable and tiltable;
   an urging member to urge the pin toward the opening; and
   a stopper to limit the range of movement of the pin in the axial direction, wherein, when the window is opened, the urging member keeps the pin untilted.

38. A wiper device for wiping a window supported by a support, the wiper device being located between the window and the support, wherein the window opens and closes an opening in the support, the wiper device comprising:
   an actuator supported by the support, the actuator having an output shaft;
   a first coupler attached to the output shaft, wherein the actuator pivots the first coupler in the first angle range, wherein the first coupler includes a first engagement member, the first engagement member being radially spaced from the axis of the output shaft;
   a pivot shaft rotatably supported by the window, wherein, when the window is closed, the axis of the pivot shaft is aligned with the axis of the output shaft;
   a second coupler attached to the pivot shaft by a lever, wherein the second coupler includes a second engagement member, the second engagement member being radially spaced from the axis of the pivot shaft, wherein, when the window is closed and the second coupler is at a predetermined rotational phase relative to the first coupler, the first and second engagement members are engaged, so that the second coupler is coupled to the first coupler to transmit rotation of the output shaft to the pivot shaft; and
   a wiper arm attached to the pivot shaft, wherein, when the actuator is activated with the second coupler coupled to the first coupler, the wiper arm pivots in an angle range corresponding to the first angle range,
   wherein one of the first and second engagement members is the wall of a recess and the other is a projection, wherein, when the second coupler is outside the first angle range, the recess and the projection cooperate to guide the second coupler to the first angle range, wherein the recess includes a large portion, which has a diameter larger than the diameter of the projection, and a small portion, which has a diameter substantially the same as the diameter of the projection, wherein the projection enters the large portion before entering the small portion when the first and second couplers are coupled.

* * * * *